United States Patent
McNamara et al.

(10) Patent No.: US 12,337,305 B2
(45) Date of Patent: Jun. 24, 2025

(54) METHOD OF MANUFACTURING CATALYST INTERMEDIATE

(71) Applicant: Johnson Matthey Public Limited Company, London (GB)

(72) Inventors: Nicholas McNamara, Wayne, PA (US); Peter Charles Stonehouse, Wayne, PA (US); Austin Gregory Gallagher, Savannah, GA (US); Alessandro Turrina, Billingham (GB); Yvonne Truckle, Billingham (GB); Daniel Peter Depuccio, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 75 days.

(21) Appl. No.: 17/931,955

(22) Filed: Sep. 14, 2022

(65) Prior Publication Data

US 2023/0096246 A1    Mar. 30, 2023

Related U.S. Application Data

(60) Provisional application No. 63/369,999, filed on Aug. 1, 2022, provisional application No. 63/261,864, filed on Sep. 30, 2021.

(51) Int. Cl.
*B01J 37/00* (2006.01)
*B01J 23/63* (2006.01)
*B01J 37/08* (2006.01)

(52) U.S. Cl.
CPC ........... *B01J 37/0045* (2013.01); *B01J 23/63* (2013.01); *B01J 37/08* (2013.01)

(58) Field of Classification Search
CPC ......... B01J 37/0045; B01J 37/08; B01J 23/63
See application file for complete search history.

(56) References Cited

U.S. PATENT DOCUMENTS

| 9,724,644 B2 * | 8/2017 | Matsueda ............ B01J 23/6527 |
| 9,827,562 B2 | 11/2017 | Qi et al. |
| 10,422,036 B2 | 9/2019 | Xiao et al. |
| 2019/0160427 A1 | 5/2019 | Deeba et al. |

FOREIGN PATENT DOCUMENTS

| EP | 3034167 A1 | 6/2016 |
| JP | 2007275878 A | 10/2007 |
| WO | 2017218092 A2 | 12/2017 |

OTHER PUBLICATIONS

Li, et al., "Designed synthesis of highly active CeO2—ZrO2—Al2O3 support materials with optimized surface property for Pd-only three-way catalysts", Applied, Surface Science, vol. 506, 2020.
Lan, et al., "Optimized synthesis of highly thermal stable CeO2—ZrO2/Al2O3 composite for improved Pd-only three-way catalyst", Materials and Design, vol. 147, pp. 191-199, 2018.
Lee, et al., "Pt nanoparticles encapsulated in CeO2 over-layers synthesized by controlled reductive treatment to suppress CH4 formation in high-temperature water-gas shift reaction", Journal of Catalysis, vol. 395, pp. 246-257, 2021.
Seo, et al., "Facile, one-pot synthesis of Pd@CeO2 core@shell nanoparticles in aqueous environment by controlled hydrolysis of metalloorganic cerium precursor", Materials Letters, vol. 206, pp. 105-108, 2017.
Hill, et al., "Thermally Induced Restructuring of Pd@CeO2 and Pd@SiO2 Nanoparticles as a Strategy for Enhancing Low-Temperature Catalytic Activity", ACS Catalysis, vol. 10, pp. 1731-1741, 2020.
Montini, et al., "Rh(1%)@CexZr1[1]xO2-Al2O3 nanocomposites: Active and stable catalysts for ethanol steam reforming", Applied Catalysis B, vol. 71, pp. 125-134, 2007.

* cited by examiner

*Primary Examiner* — Yong L Chu

(57) ABSTRACT

A method of manufacturing a catalyst intermediate is provided. The method comprises: providing a slurry comprising a hydrous oxide of one or more of aluminium, cerium and zirconium; and contacting the slurry comprising a hydrous oxide with platinum group metal (PGM) ions to provide a PGM-containing slurry.

22 Claims, 10 Drawing Sheets

METHOD OF MANUFACTURING CATALYST INTERMEDIATE

FIELD OF THE INVENTION

The present invention relates to a new method of manufacturing a catalyst intermediate for use in a washcoat formulation for the preparation of a catalyst article for treating exhaust gas, for example, and specifically to a method of manufacturing a catalyst intermediate, a catalyst intermediate, a washcoat formulation, a method of manufacturing a catalyst article and a catalyst article.

BACKGROUND OF THE INVENTION

Internal combustion engines produce exhaust gases containing a variety of pollutants, including hydrocarbons (HCs), carbon monoxide (CO), and nitrogen oxides ("$NO_x$").

Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

Such TWCs typically comprise a substrate and one or more catalyst layers or regions applied thereto. A typical method of manufacturing such a TWC may therefore involve applying a washcoat (e.g. a slurry) comprising catalytically active particles to the substrate and calcining the particles within the slurry on the substrate. The washcoat typically comprises one or more platinum group metals (PGMs) loaded onto a support material. The support material may comprise an inorganic oxide, for example, such as ceria, alumina, zirconia or a mixed oxide thereof.

However, problems associated with such typical methods of manufacturing TWCs, or other catalyst articles for treating exhaust gas, include difficulties in efficiently loading the PGMs onto the support material. This may be due to poor uptake of the PGMs onto the inorganic oxide support material, for example. Moreover, the relatively large PGM particles that may form on the surface of such loaded support materials may then be likely to sinter during the calcination step of manufacture and/or during use in an exhaust system. Such sintering means that larger PGM particles than desired may be present on the final catalyst article (e.g. TWC) or increase during use, which may result in a lower catalytic activity of the catalyst article. Such reduction in catalytic activity as a result of having larger particles is known, and may be as a result of having a reduced total PGM surface area compared to smaller PGM particles that have not undergone sintering.

Accordingly, there is a desire to reduce the likelihood of sintering of the PGM particles in a catalyst article (e.g. a TWC), in particular rhodium particles, as a result of the calcination during manufacture and/or the harsh ageing conditions in exhaust systems for internal combustion engines, in particular gasoline engines.

SUMMARY OF THE INVENTION

One aspect of the present disclosure is directed to a method of manufacturing a catalyst intermediate, the method comprising: providing a slurry comprising a hydrous oxide of one or more of aluminium, cerium and zirconium; and contacting the slurry comprising a hydrous oxide with platinum group metal (PGM) ions to provide a PGM-containing slurry.

Another aspect of the present disclosure is directed to a catalyst intermediate manufactured by the method of manufacturing a catalyst intermediate described herein.

Another aspect of the present disclosure is directed to a catalyst intermediate comprising: a hydrous oxide network comprising a hydrous oxide of one or more of aluminium, cerium and zirconium, the hydrous oxide network comprising PGM ions encapsulated therein.

Another aspect of the present disclosure is directed to a washcoat formulation for the preparation of a catalyst article for treating exhaust gas, the washcoat formulation comprising the catalyst intermediate described herein.

Another aspect of the present disclosure is directed to a method of manufacturing a catalyst article, the method comprising: manufacturing a catalyst intermediate according to a method described herein or providing a catalyst intermediate as described herein; providing a slurry comprising the catalyst intermediate; applying the slurry comprising the catalyst intermediate to a substrate; and heating the slurry.

Another aspect of the present disclosure is directed to a method of manufacturing a catalyst article, the method comprising: manufacturing a catalyst intermediate according to a method described herein or providing a catalyst intermediate as described herein; calcining the catalyst intermediate to form a catalyst composition; providing a slurry comprising the catalyst composition; applying the slurry comprising the catalyst composition to a substrate; and heating the slurry.

Another aspect of the present disclosure is directed to a catalyst article manufactured by the method of manufacturing a catalyst article described herein.

Another aspect of the present disclosure is directed to an intermediate comprising: a hydrous oxide of one or more of aluminium, cerium and zirconium, wherein the hydrous oxide has a hydroxyl content of greater than 1 μmol/g.

Another aspect of the present disclosure is directed to a method of manufacturing an intermediate, the method comprising: (1) providing a slurry comprising a hydrous oxide of one or more of aluminium, cerium and zirconium; and (2a) heating the slurry in (1); and/or (2b) adjusting the pH of the slurry in (1) to from 7 to 14.

DETAILED DESCRIPTION OF THE INVENTION

Figure 1:
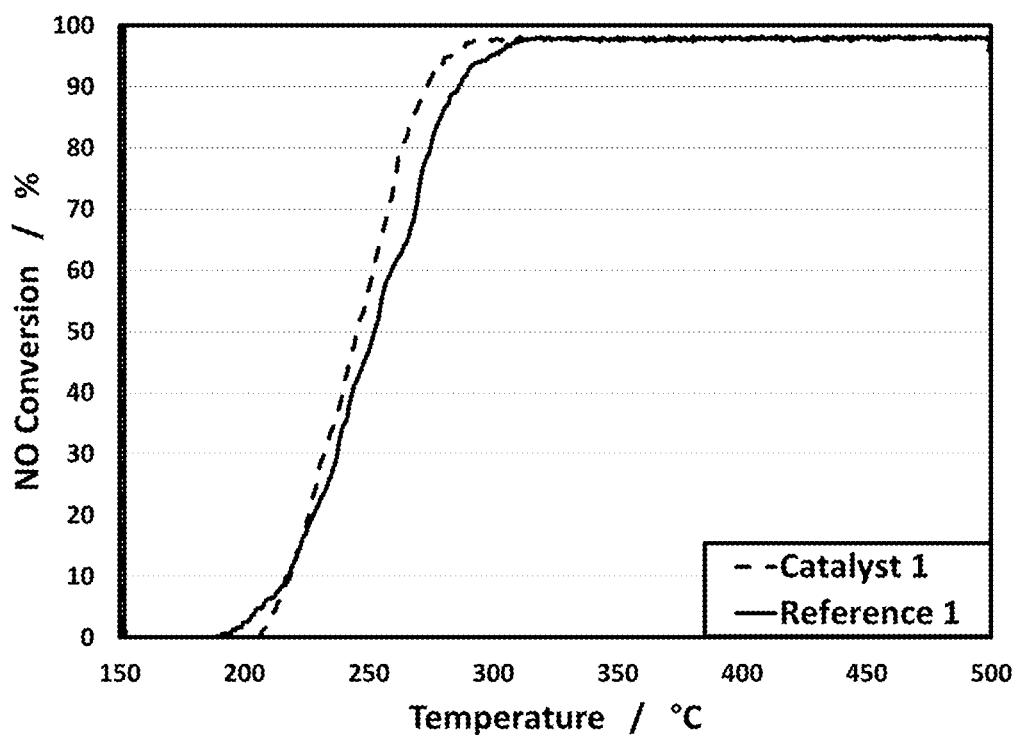
FIG. 1 shows the NO conversion for Reference 1 and Catalyst 1 during the powder catalyst TWC Light-Off test.

The present invention seeks to tackle at least some of the problems associated with the prior art or at least to provide a commercially acceptable alternative solution thereto.

In a first aspect, the present invention provides a method of manufacturing a catalyst intermediate, the method comprising: providing a slurry comprising a hydrous oxide of one or more of aluminium, cerium and zirconium; and contacting the slurry comprising a hydrous oxide with platinum group metal (PGM) ions to provide a PGM-containing slurry.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when used in an emission treatment system, a catalyst article manufactured by using a catalyst intermediate manufactured according to the present invention in the preparation of a catalyst washcoat, for example, may exhibit one or more of the following advantageous properties: increased thermal durability of the catalyst article, lower light-off temperature after accelerated aging at high temperature [for total hydrocarbon (THC), CO and $NO_x$ catalysis], superior/increased conversion at high temperature (of THC, CO and $NO_x$) and higher conversion across a wide range of air-to-fuel ratios. Moreover, in part due to the above advantageous properties, in particular the increased activity, such catalyst articles may provide for the opportunity for PGM, such as rhodium, thrifting (i.e. reducing the loading thereof while maintaining comparable or higher level of catalytic activity).

Typically, in industry the mixed oxide support materials for the PGMs are provided from the suppliers in their calcined forms, i.e. as a solid mixed oxide support material. The mixed oxide support material may or may not then be reduced to smaller particles by milling prior to loading of the PGMs onto the support material. However, in contrast with this standard practice, the inventors of the present invention have devised a method of manufacturing a catalyst intermediate for use in preparing a washcoat formulation, for example, that starts from the hydrous oxide form of the support material, i.e. prior to calcination of the support material to obtain the solid oxide form. Accordingly, such a method may advantageously be able to exploit the interesting surface chemistry of the hydrous oxide form and its interaction with the PGM ions prior to calcination.

For example, without wishing to be bound by theory, it is hypothesised that the PGM ions interact strongly with the hydroxyl functional groups on the hydrous oxide in the slurry via electrostatic interactions. In fact, the PGM uptake may directly correlate with the surface charge of the hydrous oxide, which may allow for facile fixing of the PGM. Thus, this strong interaction may lead to strongly fixed PGM ions that are highly evenly dispersed throughout the hydrous oxide. In the slurry, it is hypothesised that the hydrous oxide may then at least partially form a network, for example a porous network, which may encapsulate the highly-dispersed PGMs therein. Calcination of the hydrous oxide may then lead to a (mixed) oxide support material comprising PGM particles encapsulated therein. As a result of the above-described method and the highly-dispersed PGMs, very small PGM particle sizes may form within the mixed oxide, for example due to the strong interactions keeping the PGM ions/particles apart during the process. Moreover, encapsulation of the PGM particles within the porous network may provide a physical barrier that reduces the likelihood of PGM particle sintering during use of the resulting catalyst article or during the calcination process itself.

For at least these reasons it is hypothesised that the above-described advantageous properties are realised. For example, without wishing to be bound by theory it is hypothesised that this may be because (i) the particles sizes of the PGM particles encapsulated within the support material are kept small (i.e. increasing the PGM surface-area-to-volume ratio) and (ii) the PGM particles may be less likely to sinter under harsh conditions, such as the high temperatures during calcination and/or during use of such a catalyst article in an exhaust system, thereby leading to deactivation of the catalyst.

This novel starting position for the preparation of a washcoat therefore goes against standard practices in the industry (e.g. simply obtaining the calcined (mixed) oxide support materials from a supplier and loading the PGMs thereon) and surprisingly and unexpectedly achieves improved catalytic properties of the final catalyst article prepared using such a technique to prepare the catalyst intermediate.

The term "catalyst intermediate" as used herein may encompass a precursor, for example, for a catalyst composition that exhibits catalytic activity, particularly for use in the treatment of exhaust gas from an internal combustion engine, preferably a gasoline engine. The term "precursor" as used herein may encompass a composition that is formed prior to being used to provide a further target composition. In other words, the term "intermediate" is used within its normal meaning in the field of chemistry, for example. The catalyst intermediate may therefore be a precursor to a catalyst composition capable of demonstrating catalytic activity towards one or more of the oxidation of CO, the oxidation of unburnt HCs and the reduction of $NO_x$.

The term "slurry" as used herein may encompass a liquid comprising insoluble material, e.g. insoluble particles. A slurry may comprise (1) solvent or liquid, typically comprising water; (2) soluble content; and (3) insoluble content.

The term "hydrous oxide" as used herein may encompass an inorganic compound of a metal, hydroxide and weakly bound water. In other words, the term "hydrous oxide" is used within its normal meaning in the art.

Contacting the slurry comprising a hydrous oxide with platinum group metal (PGM) ions may typically comprise mixing a solution comprising PGM ions with the slurry comprising a hydrous oxide, for example. Alternatively, a PGM precursor, such as a water-soluble PGM salt may be added to the slurry comprising a hydrous oxide. The method of contacting the slurry comprising a hydrous oxide with platinum group metal (PGM) ions is not particularly limited. The PGM ions are typically provided in the form of a suitable PGM salt, such as a nitrate, sulfate or chloride, for example.

The PGM-containing slurry preferably comprises a hydrous oxide network comprising the PGM ions encapsulated therein. The term "hydrous oxide network" as used herein may encompass a matrix or lattice structure formed by the hydrous oxide. The term "encapsulated" as used herein may encompass a structure in which the PGM ions are associated with the hydrous oxide network, particularly wherein the PGM ions are located within the pores of the network or lattice structure, for example. The PGM ions are typically associated with or coordinated to the hydroxyl groups on the hydrous oxide network.

To facilitate the formation of a hydrous oxide network comprising the PGM ions encapsulated therein, the method preferably further comprises heating the PGM-containing slurry. Heating the PGM-containing slurry is preferably carried out at a temperature of from 20 to 250° C., more preferably <50° C. Without wishing to be bound by theory, it is thought that the heating of the PGM-containing slurry may increase the rate of formation of the network. The heating may also increase the rate of PGM ion association with the hydrous oxide. Preferably, the heating step does not result in calcination of the hydrous oxide.

The slurry comprising a hydrous oxide may also at least partially comprise a hydrous oxide network prior to contacting the slurry with PGM ions. To facilitate the formation of a hydrous oxide network at this stage of the method, the method preferably further comprises a step of heating the slurry comprising a hydrous oxide prior to contacting the slurry comprising a hydrous oxide with PGM ions. Heating the slurry comprising a hydrous oxide network is preferably carried out at a temperature of from 20 to 250° C., more preferably from 50 to 200° C., most preferably from 100 to 175° C. Without wishing to be bound by theory, it is thought that the heating of the slurry comprising a hydrous oxide may increase the rate of formation of the network. It is essential that the heating at this stage of the method (i.e. prior to the addition of the PGM ions) does not cause substantial calcination of the hydrous oxide, so that the desired interactions of the PGM ions with the hydroxyl groups of the hydrous oxide may be realised.

Although it is still possible to achieve the purpose of the invention with this additional step of heating prior to the addition of the PGM ions, it may be preferable to exclude this step in order to help the PGM ions be as homogenously dispersed within the hydrous oxide network as possible, i.e. by adding the PGM ions before any substantial formation of a hydrous oxide network. Alternatively, in some embodiments, it may be preferable to include the heating step prior to contacting the slurry comprising a hydrous oxide with PGM ions. This may lead to better performance, depending on which hydrous oxide is being used, for example.

Either of the heating steps preferably comprises hydrothermal treatment. The hydrothermal treatment may comprise raising the pH to greater than 7, raising the temperature above room temperature (about 20° C.) and stirring/mixing the slurry. Without wishing to be bound by theory, it is thought that increasing the pH may catalyse the network formation, increasing the temperature may increase the rate of network formation, and stirring/mixing may increase the rate of network formation and may result in a more homogeneous network.

Preferably, the method further comprises adjusting the pH of the slurry comprising a hydrous oxide and/or the PGM-containing slurry to from 7 to 14. Preferably, the pH is adjusted to from 8 to 13, more preferably from 9 to 12, even more preferably to from 10 to 11. Without wishing to be bound by theory, it is thought that such an elevated pH may help to facilitate and/or increase the rate of formation of the hydrous oxide network, for example by catalysing the process such as by catalysing a reaction between hydroxyl groups which may lead to the formation of a network. Without wishing to be bound by theory, the process could be considered to be a balance between consuming the hydroxyl groups to form the network while allowing for some hydroxyls to remain to bind to the PGM ions, for example. The pH may be adjusted using any suitable base, such as, for example, ammonium hydroxide, sodium hydroxide, potassium hydroxide, and/or organic bases such as ammonium hydroxides, for example tetraethyl ammonium hydroxide. The selection of the base is not particularly limited, provided that the substance does not negatively interfere with the method, for example. Moreover, without wishing to be bound by theory, it is thought that increasing the number of hydroxyl groups within the hydrous oxide may lead to an increased uptake of PGM ions, due to an increased number of available electrostatic interactions. However, an increase in the number of hydroxyl groups within the hydrous oxide may also lead to an increased viscosity of the slurry. Thus, a balance between the descried PGM uptake and viscosity of the slurry may need to be found, depending on the application.

Preferably, the catalyst intermediate is for use in a washcoat formulation for the preparation of a catalyst article for treating exhaust gas. More preferably, the catalyst article is for three-way catalysis.

Preferably, the hydrous oxide has not been calcined. Calcination of the hydrous oxide may form the solid inorganic oxide of the metal, i.e. substantially without the hydroxyl functional groups for the PGM ions to interact with and substantially without the ability to form a hydrous oxide network. Accordingly, sintering of the hydrous oxide may not cause the above-described advantages to be realised regarding the differences between the use of the hydrous oxide and the use of a sintered inorganic oxide.

The term "platinum group metal (PGM)" as used herein refers to the metals ruthenium, rhodium, palladium, osmium, iridium, and platinum. The PGM ions preferably comprise platinum ions, palladium ions, rhodium ions or combinations thereof, more preferably rhodium ions. For example, the PGM ions preferably consist of rhodium ions. Such PGMs are particularly suited for use in the formation of TWCs and may be particularly compatible with the method of the present invention. In some embodiments, the PGM loading is 0.02-20 wt. % based on the weight of hydrous oxide. In further embodiments, the PGM loading is 0.1-10 wt. % based on the weight of hydrous oxide. In certain embodiments, the PGM (e.g., Rh) loading is 0.02-5 wt. % based on the weight of hydrous oxide. In further embodiments, the PGM (e.g., Rh) loading is 0.1-4 wt. %, 0.1-3 wt. %, 0.1-2 wt. % or 0.1-1 wt. % based on the weight of hydrous oxide. As used herein the PGM loading is calculated based on elemental PGM metal (e.g., Rh).

The hydrous oxide preferably comprises a mixed hydrous oxide of cerium and zirconium. On calcination, use of such a mixed hydrous oxide results in a ceria/zirconia mixed oxide, which may be a particularly beneficial support material for PGMs for use in a TWC, for example. This is because such a support material may exhibit high oxygen storage capacity. It is known that such properties are advantageous for use in TWCs. The hydrous oxide preferably further comprises a dopant selected from the group consisting of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, more preferably one or more of lanthanum, neodymium, praseodymium and yttrium. Such doped hydrous oxides result in doped oxides once calcined, which may be particularly effective as support materials. Preferably, the dopant is present in the hydrous oxide in an amount of from 0.001 wt. % to 20 wt. %, preferably from 0.5 wt. % to 18 wt. %; more preferably from 1 wt. % to 17 wt. %; even more preferably from 2 wt. % to 16 wt. %.

The term "mixed oxide" as used herein generally refers to a mixture of oxides in a single phase, as is conventionally known in the art.

Providing a slurry comprising a hydrous oxide preferably comprises contacting an aqueous solution comprising one or more of aluminium ions, cerium ions and zirconium ions with a basic aqueous solution. The aluminium ions, cerium ions and zirconium ions may be provided in the form of a suitable metal salt, such as a nitrate, sulfate or chloride, for example. Suitable methods of making such hydrous oxides may be known in the art. If a dopant is present, then the aqueous solution may further comprise ions of the dopant.

In a further aspect, the present invention provides a catalyst intermediate manufactured by the method described herein.

In a further aspect, the present invention provides catalyst intermediate comprising: a hydrous oxide network comprising a hydrous oxide of one or more of aluminium, cerium and zirconium, the hydrous oxide network comprising PGM ions encapsulated therein.

The catalyst intermediate is preferably for use in a washcoat formulation for the preparation of a catalyst article for treating exhaust gas, more preferably the catalyst article is for three-way catalysis.

Preferably, the hydrous oxide network has not been calcined.

The PGM ions preferably comprise platinum ions, palladium ions, rhodium ions or combinations thereof, more preferably the PGM ions comprise rhodium ions. For example, the PGM ions preferably consist of rhodium ions. In some embodiments, the PGM loading is 0.02-20 wt. % based on the weight of hydrous oxide. In further embodiments, the PGM loading is 0.1-10 wt. % based on the weight of hydrous oxide. In certain embodiments, the PGM (e.g., Rh) loading is 0.02-5 wt. % based on the weight of hydrous oxide. In further embodiments, the PGM (e.g., Rh) loading is 0.1-4 wt. %, 0.1-3 wt. %, 0.1-2 wt. % or 0.1-1 wt. % based on the weight of hydrous oxide. As used herein the PGM loading is calculated based on elemental PGM metal (e.g., Rh).

The hydrous oxide preferably comprises a mixed hydrous oxide of cerium and zirconium. The hydrous oxide preferably further comprises a dopant selected from the group consisting of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, more preferably one or more of lanthanum, neodymium, praseodymium and yttrium. Preferably, the dopant is present in the hydrous oxide in an amount of from 0.001 wt. % to 20 wt. %, preferably from 0.5 wt. % to 18 wt. %; more preferably from 1 wt. % to 17 wt. %; even more preferably from 2 wt. % to 16 wt. %.

The hydrous oxide preferably can have a hydroxyl content (as measured using the method described in Example 2) of greater than 1 mmol/g; more preferably, at least 2 mmol/g; most preferably, at least 3 mmol/g. Alternatively, the hydrous oxide preferably can have a hydroxyl content of 2-20 mmol/g; more preferably, 3-18 mmol/g; most preferably, 4-16 mmol/g.

In a further aspect, the present invention provides a washcoat formulation for the preparation of a catalyst article for treating exhaust gas, the washcoat formulation comprising the catalyst intermediate described herein. Preferably, the catalyst article is a TWC and/or the exhaust gas is from a gasoline engine. The washcoat formulation is typically in the form of a slurry.

In a further aspect, the present invention provides a method of manufacturing a catalyst article, the method comprising: manufacturing a catalyst intermediate according to the method described herein or providing a catalyst intermediate as described herein; providing a slurry comprising the catalyst intermediate; applying the slurry comprising the catalyst intermediate to a substrate; and heating the slurry.

In a further aspect, the present invention provides a method of manufacturing a catalyst article, the method comprising: manufacturing a catalyst intermediate according to the method described herein or providing a catalyst intermediate as described herein; calcining the catalyst intermediate to form a catalyst composition; providing a slurry comprising the catalyst composition; applying the slurry comprising the catalyst composition to a substrate; and heating the slurry.

In other words, the present invention encompasses a method of manufacturing a catalyst article that may or may not involve calcining the catalyst intermediate prior to applying the catalyst intermediate or calcined product thereof to the substrate. If the catalyst intermediate is not calcined before being applied to the substrate, then the catalyst intermediate may still be calcined during the step of heating the slurry.

The term "catalyst article" used herein may encompass an article in which a catalyst is supported thereon or therein. The article may preferably take the form of, for example, a honeycomb monolith, or a filter, e.g. preferably a wall flow filter or a flow-through filter. The catalyst article may be for use in an emission treatment system, in particular an emission treatment system for a gasoline engine, preferably a stoichiometric gasoline engine. The catalyst article may be for use in three-way catalysis. In other words, the catalyst article may be a TWC.

The term "substrate" as used herein may encompass, for example, a ceramic or metallic honeycomb, or a filter block, e.g. preferably a wall flow filter or flow-through filter. The substrate may comprise a ceramic monolithic substrate. The substrate may vary in its material composition, size and configuration, cell shape and density, and wall thickness. Suitable substrates are known in the art.

Providing a slurry comprising the catalyst intermediate may comprise providing the PGM-containing slurry described herein. Alternatively, if the catalyst intermediate is separated from the PGM-containing slurry, then providing a slurry comprising the catalyst intermediate may comprise contacting the separated catalyst intermediate with a liquid, preferably water, to provide the slurry.

Calcining the catalyst intermediate to form a catalyst composition typically comprises heating the catalyst intermediate at a temperature of from 400° C. to 700° C., preferably from 400° C. to 600° C., more preferably from 450° C. to 600° C.; and/or for from 10 to 360 minutes, preferably from 35 to 120 minutes. However, calcining may be performed by any calcination technique known in the art. The calcination process may convert the hydrous oxide (network) into the solid oxide form of the support material. The term "calcination" or "calcine" as used herein may encompass a process of thermally treating a substance, preferably for the purpose of causing a chemical and/or physical change in the substance and/or removing impurities. The term "calcination" or "calcine" as used herein may encompass thermally treating the substance in air.

The term "catalyst composition" as used herein may encompass a composition that exhibits catalytic activity, particularly for use in the treatment of exhaust gas, preferably from a gasoline engine. In other words, the catalytic composition may demonstrate catalytic activity towards one or more of the oxidation of CO, the oxidation of unburnt HCs and the reduction of $NO_x$. Preferably, the catalyst composition is for three-way catalysis. In other words, the catalyst composition may be a three-way catalyst. In the present invention, the catalyst composition may therefore be one or more PGMs supported on and/or in an inorganic oxide, the inorganic oxide comprising an oxide of aluminium, cerium, zirconium or mixtures thereof.

Providing a slurry comprising the catalyst composition typically comprises contacting the catalyst composition with a liquid, preferably water, to provide the slurry.

Applying the slurry comprising the catalyst intermediate or the slurry comprising the catalyst composition to a substrate may be carried out using techniques known in the art. Typically, the slurry may be poured into the inlet or outlet of the substrate using a specific moulding tool in a predetermined amount, thereby disposing the catalyst intermediate or catalyst composition on the substrate. Alternatively, or in addition, the substrate may be at least partially immersed in the slurry. Subsequent vacuum, air knife and drying steps may be employed during the application step. For example, once the slurry has been poured into the inlet or outlet, or once the substrate has been immersed in the slurry, a vacuum and/or air knife may be applied to the inlet and/or outlet to disperse the slurry throughout the substrate and/or remove excess slurry from the substrate. When the support is a filter block, the catalyst intermediate or catalyst composition may be disposed on the filter walls, within the filter walls (if porous) or both.

A slurry is particularly effective at disposing a material onto a substrate, in particular for maximized gas diffusion and minimized pressure drop during catalytic conversion. Prior to being disposed on the substrate, the slurry is typically stirred, more typically for at least 10 minutes, more typically for at least 30 minutes, even more typically for at least an hour.

The catalyst article is preferably for three-way catalysis.

Preferably, the method further comprises contacting the slurry comprising the catalyst intermediate or the slurry comprising the catalyst composition with a binder, preferably a slurry comprising the binder. The binder preferably comprises alumina, preferably gamma alumina. The alumina is preferably doped with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, more preferably one or more of lanthanum, neodymium, praseodymium and yttrium. The dopant is preferably present in the alumina in an amount of from 0.001 wt. % to 20 wt. %, preferably 0.01 wt. % to 18 wt. %, more preferably 0.1 wt. % to 15 wt. %, most preferably from 0.5 wt. % to 10 wt. %. Such additional components for the slurry/washcoat formulation are typical for the manufacture of TWCs, for example.

The method may further comprise adjusting the pH of the slurry comprising the catalyst intermediate or the slurry comprising the catalyst composition to 8 or less. This is a typical step during a wash coating procedure and may be primarily for adjusting the rheology (e.g. viscosity) of the slurry so that it can be coated onto a substrate more easily. However, in the method of the present invention, in particular in the aspect in which the catalyst intermediate is not calcined before being applied to the substrate, such a step of lowering the pH may not be required. The rheology (e.g. viscosity) may be adjusted in other ways.

Preferably, the method further comprises adjusting the viscosity of the slurry comprising the catalyst intermediate or the slurry comprising the catalyst composition prior to applying said slurry to a substrate. Suitable techniques for adjusting the viscosity of the slurry are known in the art and may include one or more of adjusting the temperature, pH adjustment, and addition of thickening agents, to an appropriate viscosity for coating a substrate using standard coating techniques.

Preferably, the method further comprises introducing one or more of a promoter salt, an acid or a base, and a thickening agent to the slurry comprising the catalyst intermediate or the slurry comprising the catalyst composition.

Promoters may include, for example, a non-PGM transition metal element, a rare earth element, an alkali or alkali earth group element, and/or a combination of two or more of the above elements within the same or different groups in periodic table. The promoter may be a salt of such elements. A particularly preferred promoter is barium, with particularly preferred salts thereof being barium acetate, barium citrate and barium sulfate, or a combination thereof, more preferably barium citrate.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include glactomanna gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

Applying the slurry comprising the catalyst intermediate or the slurry comprising the catalyst composition to a substrate preferably comprises contacting the slurry with the substrate (e.g. pouring the slurry into an inlet and/or outlet of the substrate and/or at least partially immersing the substrate in the slurry) and optionally: applying a vacuum to the substrate, and/or drying the slurry on the substrate. This may result in a favourable distribution of the loaded support material on the substrate. Preferably, the drying occurs: at a temperature of from 60° C. to 200° C., preferably from 70° C. to 130° C.; and/or for from 10 to 360 minutes, preferably from 15 to 60 minutes.

The substrate may be a "blank", i.e. un-washcoated, substrate. Alternatively, the substrate may have one or more washcoats already loaded thereon. In such a situation, the final catalyst article may comprise multiple layers of different washcoats.

The substrate preferably comprises cordierite. Cordierite substrates are particularly suitable for use in catalyst articles.

The substrate is preferably in the form of a honeycomb monolith, a wall flow filter or a flow through filter.

Heating the slurry is preferably carried out: at a temperature of from 400° C. to 700° C., preferably from 400° C. to 600° C., more preferably from 450° C. to 600° C.; and/or for from 10 to 360 minutes, preferably from 35 to 120 minutes. Heating the slurry preferably comprises calcining.

In a further aspect, the present invention provides a catalyst article manufactured by the method of manufacturing a catalyst article described herein. Preferably, the catalyst article is for three-way catalysis.

In a further aspect, the present disclosure is directed to an intermediate comprising: a hydrous oxide of one or more of aluminium, cerium and zirconium, wherein the hydrous oxide has a hydroxyl content of greater than 1 mmol/g.

The hydrous oxide preferably comprises a mixed hydrous oxide of cerium and zirconium. The hydrous oxide preferably further comprises a dopant selected from the group consisting of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, more preferably one or more of lanthanum, neodymium, praseodymium and yttrium. Preferably, the dopant is present in the hydrous oxide in an amount of from 0.001 wt. % to 20 wt. %, preferably from 0.5 wt. % to 18 wt. %; more preferably from 1 wt. % to 17 wt. %; even more preferably from 2 wt. % to 16 wt. %.

The hydrous oxide preferably can have a hydroxyl content (as measured using the method described in Example 2) of greater than 1 mmol/g; more preferably, at least 2 mmol/g; most preferably, at least 3 mmol/g. Alternatively, the hydrous oxide preferably can have a hydroxyl content of 2-20 mmol/g; more preferably, 3-18-mmol/g; most preferably, 4-16 mmol/g. In some embodiments, the hydrous oxide can have a hydroxyl content of 2-14 mmol/g, 3-12 mmol/g, or 4-10 mmol/g.

In another aspect, the present invention provides a method of manufacturing an intermediate, the method comprising: (1) providing a slurry comprising a hydrous oxide of one or more of aluminium, cerium and zirconium; and (2a) heating the slurry in (1); and/or (2b) adjusting the pH of the slurry in (1) to from 7 to 14.

Heating the slurry in (1) is preferably carried out at a temperature of from 20 to 250° C., more preferably from 50 to 200° C., most preferably from 100 to 175° C.

The heating step preferably comprises hydrothermal treatment. The hydrothermal treatment may comprise raising the pH to greater than 7, raising the temperature above room temperature (about 20° C.) and stirring/mixing the slurry.

Preferably, the method further comprises adjusting the pH of the slurry comprising a hydrous oxide to from 8 to 13, more preferably from 9 to 12, even more preferably to from 10 to 11. The pH may be adjusted using any suitable base, such as, for example, ammonium hydroxide, sodium hydroxide, potassium hydroxide, and/or organic bases such as ammonium hydroxides, for example tetraethyl ammonium hydroxide. The selection of the base is not particularly limited, provided that the substance does not negatively interfere with the method, for example.

Preferably, the intermediate can have a hydroxyl content (as measured using the method described in Example 2) of greater than 1 mmol/g; more preferably, at least 2 mmol/g; most preferably, at least 3 mmol/g. Alternatively, the intermediate preferably can have a hydroxyl content of 2-20 mmol/g; more preferably, 3-18 mmol/g; most preferably, 4-16 mmol/g. In some embodiments, the intermediate can have a hydroxyl content of 2-14 mmol/g, 3-12 mmol/g, or 4-10 mmol/g.

The hydrous oxide preferably comprises a mixed hydrous oxide of cerium and zirconium. On calcination, use of such a mixed hydrous oxide results in a ceria/zirconia mixed oxide, which may be a particularly beneficial support material for PGMs for use in a TWC, for example. This is because such a support material may exhibit high oxygen storage capacity. It is known that such properties are advantageous for use in TWCs. The hydrous oxide preferably further comprises a dopant selected from the group consisting of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, more preferably one or more of lanthanum, neodymium, praseodymium and yttrium. Such doped hydrous oxides result in doped oxides once calcined, which may be particularly effective as support materials. Preferably, the dopant is present in the hydrous oxide in an amount of from 0.001 wt. % to 20 wt. %, preferably from 0.5 wt. % to 18 wt. %; more preferably from 1 wt. % to 17 wt. %; even more preferably from 2 wt. % to 16 wt. %.

Providing a slurry comprising a hydrous oxide preferably comprises contacting an aqueous solution comprising one or more of aluminium ions, cerium ions and zirconium ions with a basic aqueous solution. The aluminium ions, cerium ions and zirconium ions may be provided in the form of a suitable metal salt, such as a nitrate, sulfate or chloride, for example. Suitable methods of making such hydrous oxides may be known in the art. If a dopant is present, then the aqueous solution may further comprise ions of the dopant.

The invention will now be described in relation to the following non-limiting examples.

General Preparation of Hydrous Oxide

A solution of metal ions was prepared by combining metal salt solutions of the following to 60 kg of deionized (DI) water: 6.3 kg cerium (IV) nitrate (at 19.1 wt. % $CeO_2$), 0.3 kg lanthanum (III) nitrate (at 29.4 wt. % $La_2O_3$), 0.7 kg neodymium (III) nitrate (at 29.1 wt. % $Nd_2O_3$), and 12.5 kg zirconium (IV) oxynitrate (at 19.7 wt. % $ZrO_2$, 0.43 wt. % $HfO_2$). The metal salt solution was heated to a temperature of 70° C. and stirred mechanically. To the metal ion solution was added ammonium hydroxide solution over 45 minutes to achieve a final pH ~8. The mixture was stirred at 70° C. for an additional four hours. Then the solution was cooled to under 50° C. The hydrous oxide precipitate was then filtered in a filter press and washed with DI water until the exiting solution was measured to have a conductivity of <5 mS. A small portion of the final hydrous oxide precipitate was dissolved in an acidic medium and its composition by weight was measured by inductively coupled plasma optical emission spectroscopy (ICP-OES) to be: 62.5% $ZrO_2$, 30.0% $CeO_2$, 4.8% $Nd_2O_3$, 1.5% $La_2O_3$, and 1.2% $HfO_2$.

Preparation of Reference Powdered Catalysts 100 g hydrous oxide (dry basis) was dispersed in 900 g DI water to form a slurry. A solution of ammonium hydroxide was added to the slurry to adjust the pH to ~10 to 11. The mixture was then sealed in a Hastelloy autoclave, heated to 150° C., and mechanically stirred for 2 h. Upon cooling, the treated hydrous oxide was filtered and washed with DI water until the exiting filtrate reached a neutral pH ~7. The hydrous oxide was then dried at 90° C. for 16 h, ground to a powder, and further dried at 120° C. for 2 h. Upon drying, the hydrous oxide was calcined in air at 500° C. to remove hydroxyls and convert the hydrous oxide to the solid oxide.

Reference 1: 10 g of calcined solid oxide (dry basis) was dispersed in 90 g DI water with mechanical mixing to form a slurry. The pH of the solution was raised to ~10 to 11 through the addition of ammonium hydroxide solution. 0.04 g of Rh was then added to the slurry in the form of rhodium (III) nitrate solution. A solution of ammonium hydroxide was added to the slurry to re-adjust the pH to ~10 to 11 and the slurry was mixed for 30 minutes. The slurry was then transferred to a crucible and dried at 90° C. for at least 16 h. The dried powder was ground using a mortar and pestle. The ground powder was calcined at 500° C. to form Reference 1.

Reference 2: 10 g of calcined solid oxide (dry basis) was dispersed in 90 g DI water with mechanical mixing to form a slurry. The pH of the solution was raised to ~10 to 11 through the addition of an aqueous tetraethylammonium hydroxide solution. 0.3 g of Pd was then added to the slurry in the form of palladium (II) nitrate solution. A solution of tetraethylammonium hydroxide was added to the slurry to re-adjust the pH to ~10 to 11 and the slurry was mixed for 30 minutes. The slurry was then transferred to a crucible and dried at 90° C. for at least 16 h. The dried powder was ground using a mortar and pestle. The ground powder was calcined at 500° C. to form Reference 2.

Reference 3: 10 g of calcined solid oxide (dry basis) was dispersed in 90 g DI water with mechanical mixing to form a slurry. The pH of the solution was raised to ~10 to 11 through the addition of an aqueous tetraethylammonium hydroxide solution. 0.3 g of Pd was then added to the slurry in the form of platinum (II) nitrate solution. A solution of tetraethylammonium hydroxide was added to the slurry to re-adjust the pH to ~10 to 11 and the slurry was mixed for 30 minutes. The slurry was then transferred to a crucible and dried at 90° C. for at least 16 h. The dried powder was ground using a mortar and pestle. The ground powder was calcined at 500° C. to form Reference 3.

Preparation of Powdered Catalysts of the Present Invention 100 g hydrous oxide (dry basis) was dispersed in 900 g DI water to form a slurry. A solution of ammonium hydroxide was added to the slurry to adjust the pH to ~10 to 11. The mixture was then sealed in a Hastelloy autoclave, heated to 150° C., and mechanically stirred for 2 h. Upon cooling, the treated hydrous oxide was filtered and washed with DI water until the exiting filtrate reached a neutral pH ~7.

Catalyst 1: 10 g of hydrous oxide (dry basis) was dispersed in 90 g DI water with mechanical mixing to form a slurry. The pH of the solution was raised to ~10 to 11 through the addition of ammonium hydroxide solution. 0.04 g of Rh was then added to the slurry in the form of rhodium (III) nitrate solution. A solution of ammonium hydroxide was added to the slurry to re-adjust the pH to ~10 to 11 and the slurry was mixed for 30 minutes. The slurry was then transferred to a crucible and dried at 90° C. for at least 16 h. The dried powder was ground using a mortar and pestle. The ground powder was calcined at 500° C. to form Catalyst 1.

Catalyst 2: 10 g of hydrous oxide (dry basis) was dispersed in 90 g DI water with mechanical mixing to form a slurry. The pH of the solution was raised to ~10 to 11 through the addition of an aqueous tetraethylammonium hydroxide solution. 0.3 g of Pd was then added to the slurry in the form of palladium (II) nitrate solution. A solution of tetraethylammonium hydroxide was added to the slurry to re-adjust the pH to ~10 to 11 and the slurry was mixed for 30 minutes. The slurry was then transferred to a crucible and dried at 90° C. for at least 16 h. The dried powder was ground using a mortar and pestle. The ground powder was calcined at 500° C. to form Catalyst 2.

Catalyst 3: 10 g of hydrous oxide (dry basis) was dispersed in 90 g DI water with mechanical mixing to form a slurry. The pH of the solution was raised to ~10 to 11 through the addition of an aqueous tetraethylammonium hydroxide solution. 0.3 g of Pd was then added to the slurry in the form of platinum (II) nitrate solution. A solution of tetraethylammonium hydroxide was added to the slurry to re-adjust the pH to ~10 to 11 and the slurry was mixed for 30 minutes. The slurry was then transferred to a crucible and dried at 90° C. for at least 16 h. The dried powder was ground using a mortar and pestle. The ground powder was calcined at 500° C. to form Catalyst 3.

Example 1: Accelerated Aging of Powdered Catalysts in a Reactor and Three-Way Catalysis (TWC) Light-Off Test Powdered catalysts of References 1-3 and Catalysts 1-3 were subjected to high temperature redox conditions to simulate long-term operation on a vehicle. The powders were placed in a tube furnace and heated to 1050° C. at a rate of 10° C./minute under a stoichiometric gas mixture composed of: 1.2% CO, 0.4% $H_2$, 0.8% $O_2$, 10% $H_2O$, 10% $CO_2$, balance $N_2$ flowing at 5 L/minute. The temperature was then held at 1050° C. for 40 hours while the flowing gas mixture was altered every 5 minutes in the order listed below:

1. Stoichiometric: 1.2% CO, 0.4% $H_2$, 0.8% $O_2$, 10% $H_2O$, 10% $CO_2$, balance $N_2$
2. Lean: 1.2% CO, 0.4% $H_2$, 1.6% $O_2$, 10% $H_2O$, 10% $CO_2$, balance $N_2$
3. Stoichiometric: 1.2% CO, 0.4% $H_2$, 0.8% $O_2$, 10% $H_2O$, 10% $CO_2$, balance $N_2$
4. Rich: 2.4% CO, 0.8% $H_2$, 0.8% $O_2$, 10% $H_2O$, 10% $CO_2$, balance $N_2$ After 40 h, the coated cores were cooled from 1050° C. to <400° C. under the rich gas mixture and then from 400° C. to room temperature under $N_2$ only.

Figure 2:
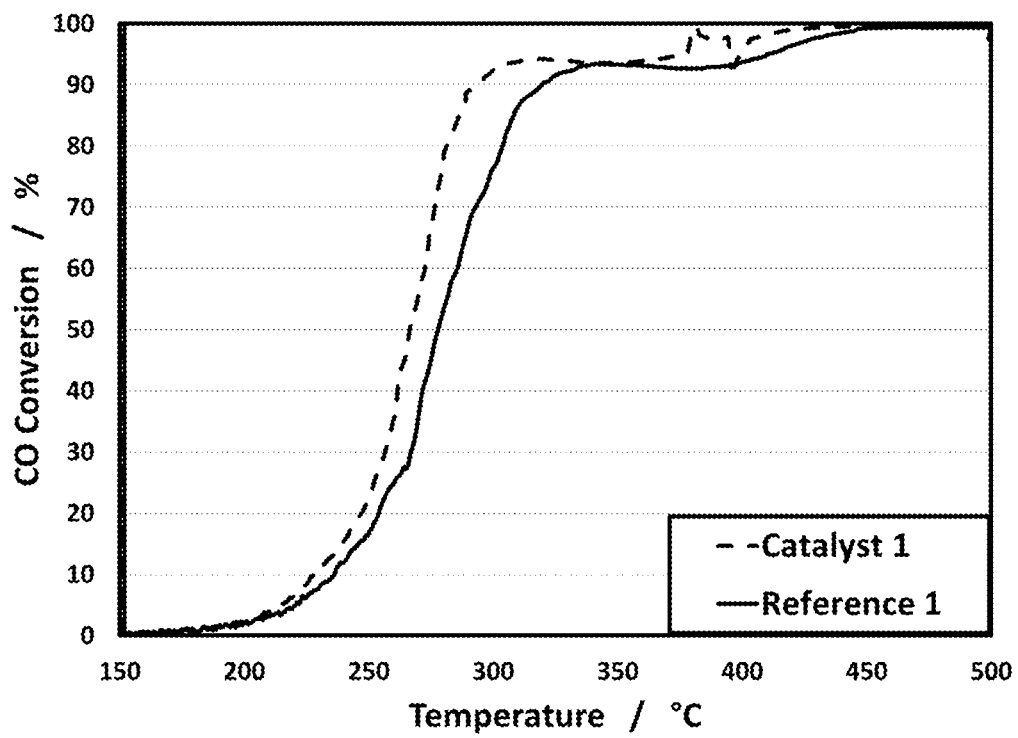
FIG. 2 shows the CO conversion for Reference 1 and Catalyst 1 during the powder catalyst TWC Light-Off test.
Figure 3:
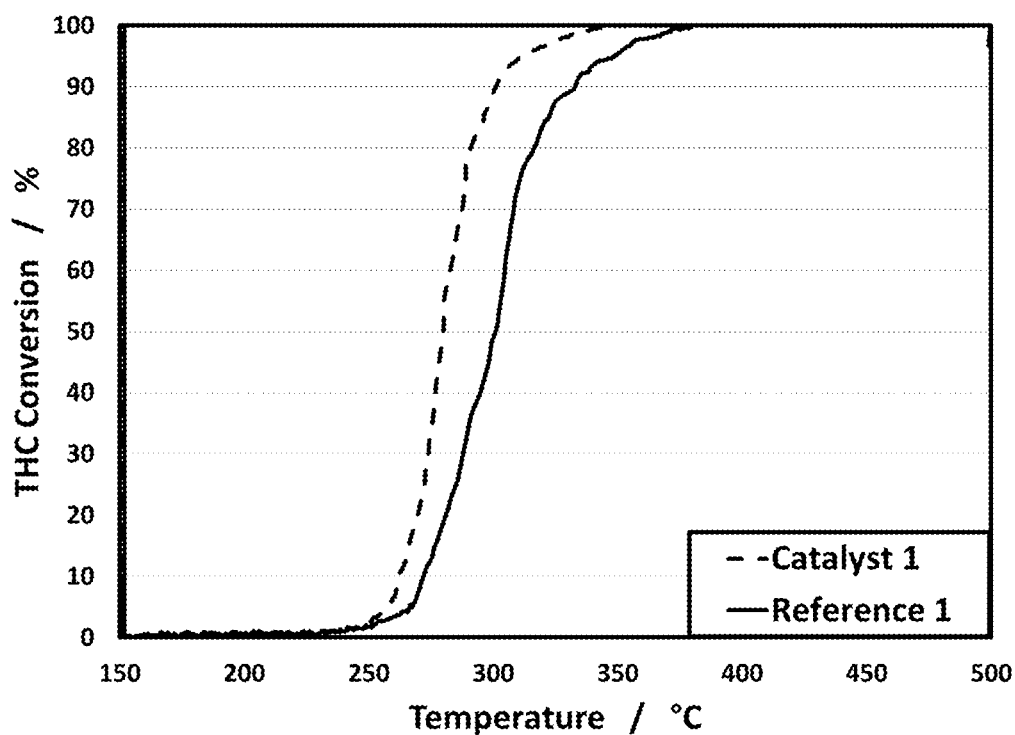
FIG. 3 shows the THC conversion for Reference 1 and Catalyst 1 during the powder catalyst TWC Light-Off test.

After being subject to accelerated aging conditions described above, Reference 1 and Catalyst 1 catalysts were subject to a TWC light-off test. In this test, 0.05 g of powdered catalyst mixed with 0.25 g of ground cordierite was loaded into a reactor apparatus capable of heating and flowing a gas mixture designed to simulate gasoline exhaust conditions. The temperature was ramped from 150° C. to 600° C. at a rate of 5° C./min under a gas mixture flowing at 500 cm³/min. The gas composition by volume was: 1% CO, 1500 ppm $C_3H_6$ (propene), 400 ppm NO, 0.65% $O_2$, 6% $H_2O$ in a balance of $N_2$. The conversions of NO, CO, and total hydrocarbons (THC, comprised of $C_3H_6$) as a function of temperature are reported in FIGS. 1-3, respectively.

A useful metric for quantifying performance of a catalyst during a light-off test is the $T_{50}$ value which is herein defined as the minimum temperature at which 50% conversion is achieved. Lower $T_{50}$ temperatures mark catalysts that demonstrate enhanced catalytic activity. In the case of each pollutant (NO, CO, and THC), the catalytic activity was greater for Catalyst 1 than for Reference 1 as evinced by the $T_{50}$ values achieved by each catalyst. Catalyst 1 achieved $T_{50}$ values for NO, CO, and THC conversions that were 8° C., 11° C., and 20° C. lower, respectively, than those of Reference 1. These results demonstrate that the Rh-containing Catalyst 1 of the present invention exhibits enhanced catalytic activity relative to Reference 1 and is suitable as a catalyst in a gasoline vehicle emissions system.

Figure 4:
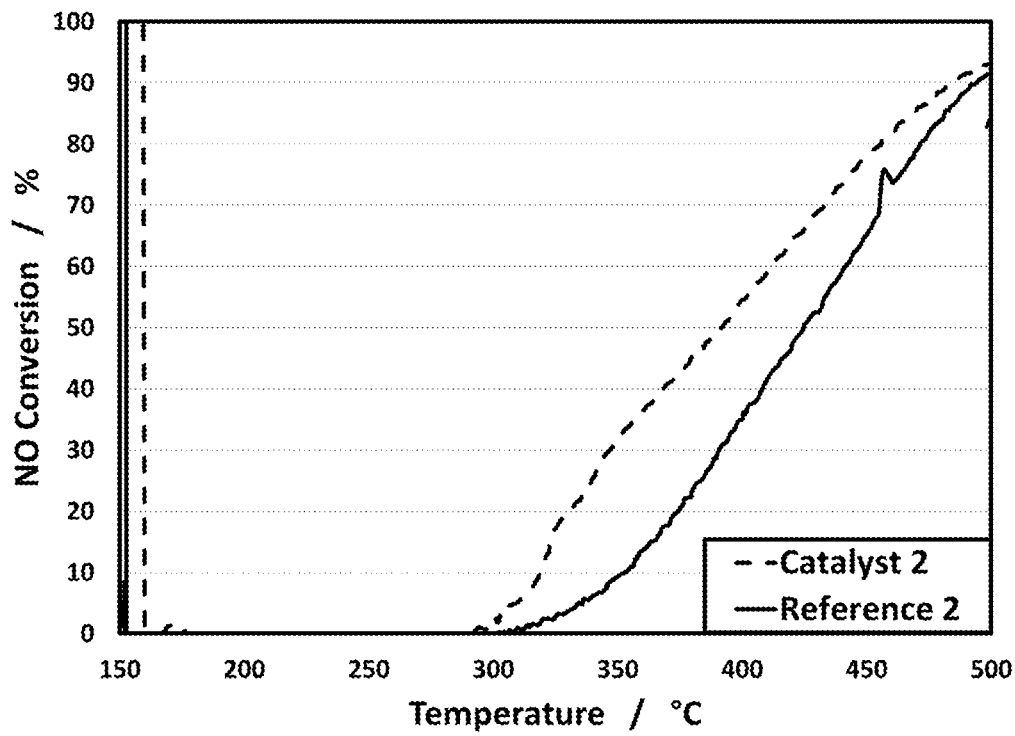
FIG. 4 shows the NO conversion for Reference 2 and Catalyst 2 during the powder catalyst TWC Light-Off test.
Figure 5:
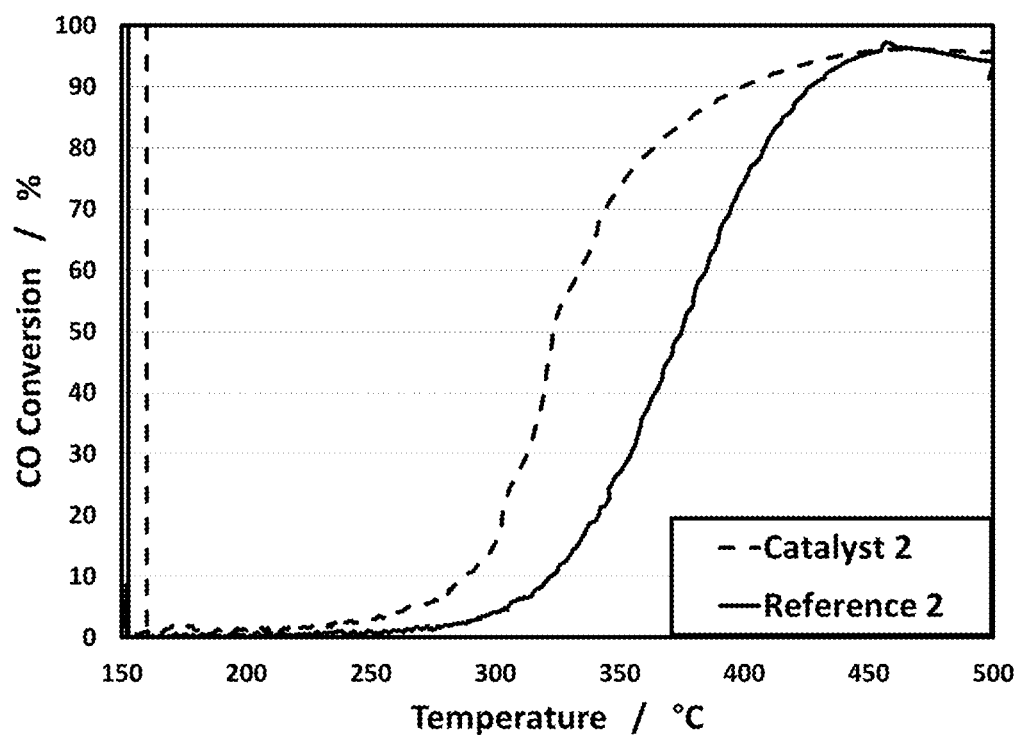
FIG. 5 shows the CO conversion for Reference 2 and Catalyst 2 during the powder catalyst TWC Light-Off test.
Figure 6:
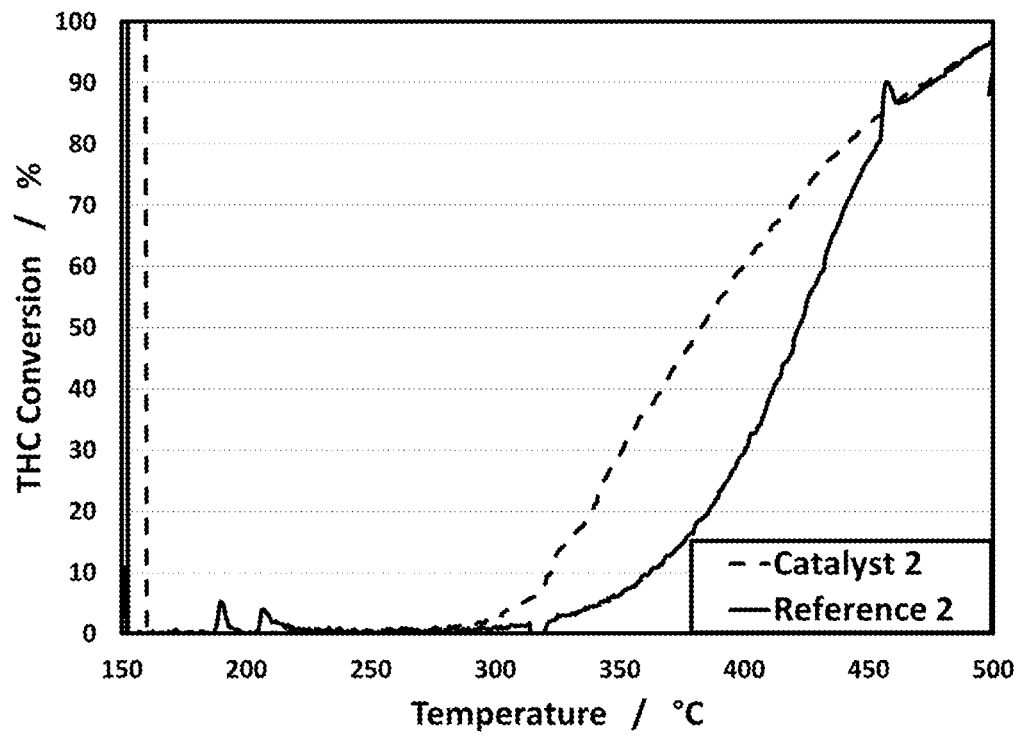
FIG. 6 shows the THC conversion for Reference 2 and Catalyst 2 during the powder catalyst TWC Light-Off test.

After being subject to accelerated aging conditions described above, Reference 2 and Catalyst 2 catalysts were subject to a TWC light-off test. The conversions of NO, CO, and total hydrocarbons (THC, comprised of $C_3H_6$) as a function of temperature are reported in FIGS. 4-6, respectively.

In the case of each pollutant (NO, CO, and THC), the catalytic activity was greater for Catalyst 2 than for Reference 2 as evinced by the $T_{50}$ values achieved by each catalyst. Catalyst 2 achieved $T_{50}$ values for NO, CO, and THC conversions that were 33° C., 51° C., and 40° C. lower, respectively, than those of Reference 2. These results demonstrate that the Pd-containing Catalyst 2 of the present invention exhibits enhanced catalytic activity relative to Reference 2 and is suitable as a catalyst in a gasoline vehicle emissions system.

Figure 7:
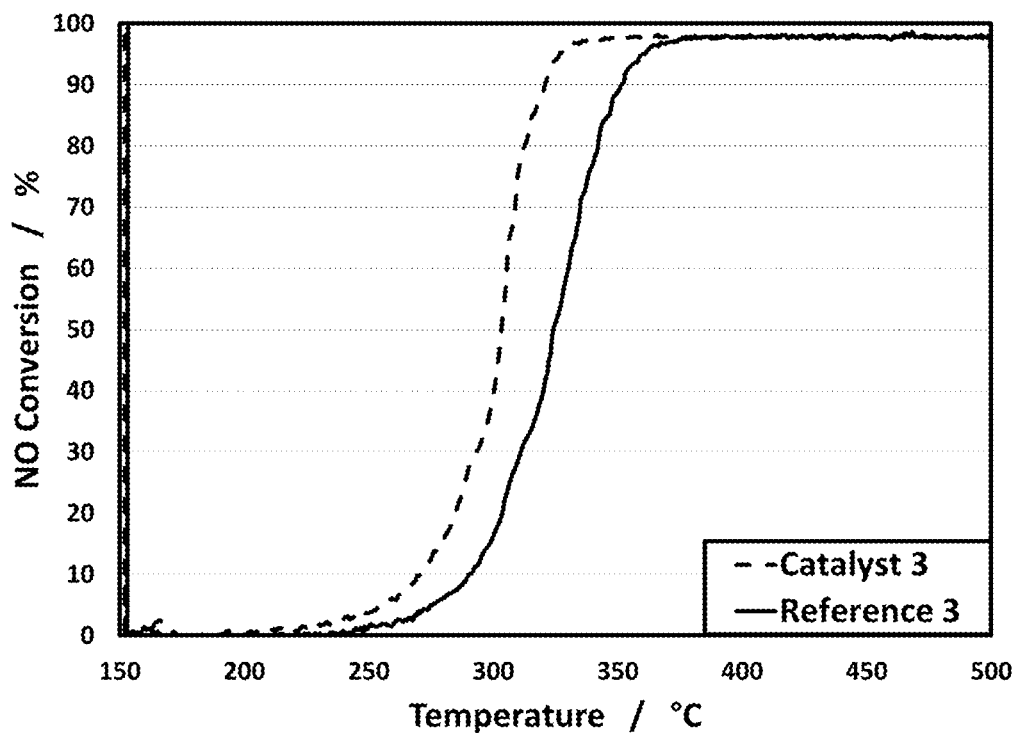
FIG. 7 shows the NO conversion for Reference 3 and Catalyst 3 during the powder catalyst TWC Light-Off test.
Figure 8:
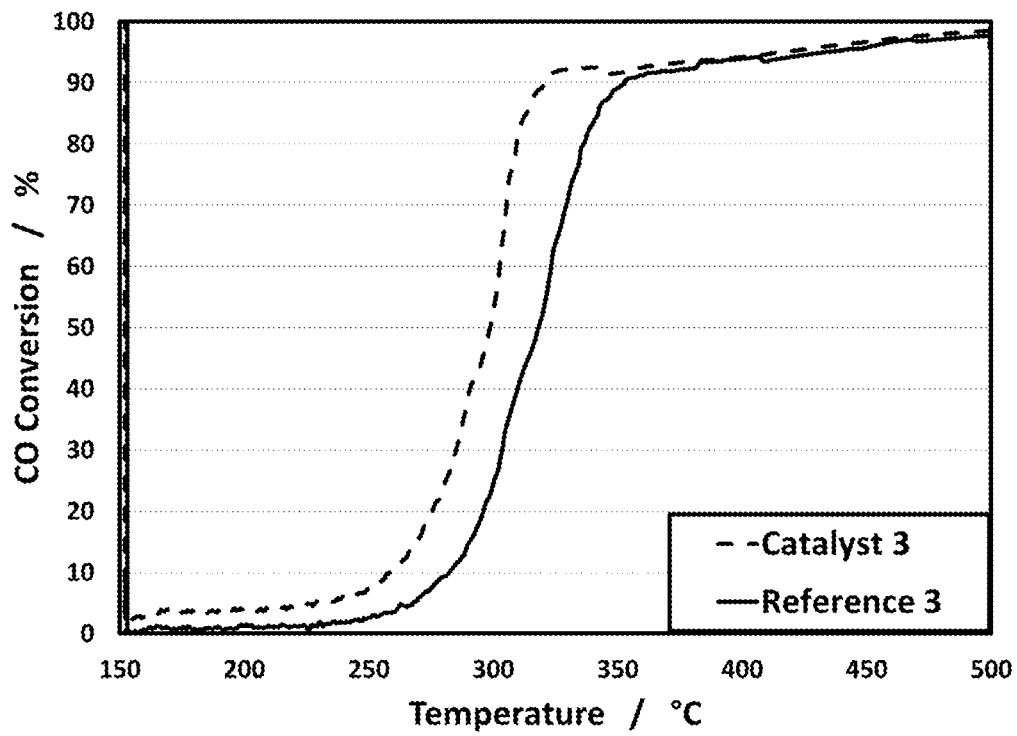
FIG. 8 shows the CO conversion for Reference 3 and Catalyst 3 during the powder catalyst TWC Light-Off test.
Figure 9:
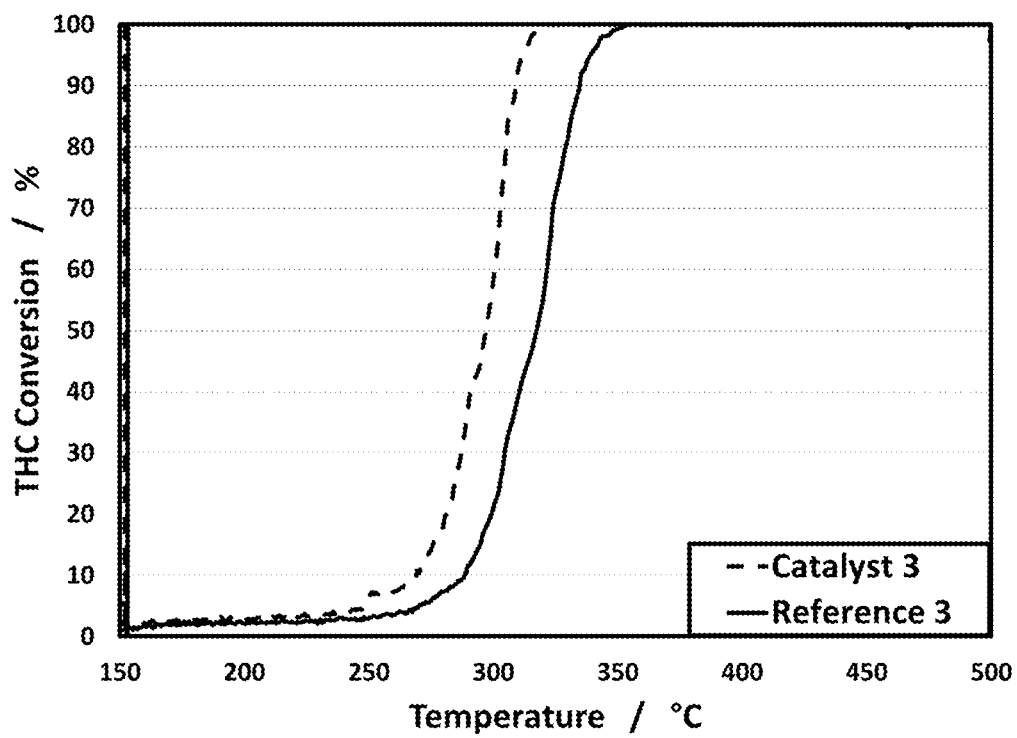
FIG. 9 shows the THC conversion for Reference 3 and Catalyst 3 during the powder catalyst TWC Light-Off test.

After being subject to accelerated aging conditions described above, Reference 3 and Catalyst 3 catalysts were subject to a TWC light-off test. The conversions of NO, CO, and total hydrocarbons (THC, comprised of $C_3H_6$) as a function of temperature are reported in FIGS. 7-9, respectively.

In the case of each pollutant (NO, CO, and THC), the catalytic activity was greater for Catalyst 3 than for Reference 3 as evinced by the $T_{50}$ values achieved by each catalyst. Catalyst 3 achieved $T_{50}$ values for NO, CO, and THC conversions that were 21° C., 20° C., and 21° C. lower, respectively, than those of Reference 3. These results demonstrate that the Pt-containing Catalyst 3 of the present invention exhibits enhanced catalytic activity relative to Reference 3 and is suitable as a catalyst in a gasoline vehicle emissions system.

Example 2: Hydroxyl Content Measurement and Rh Uptake Test

Reference 4: 100 g hydrous oxide (dry basis) was dispersed in 900 g DI water to form a slurry. A solution of ammonium hydroxide was added to the slurry to adjust the pH to ~10 to 11. The mixture was then sealed in a Hastelloy autoclave, heated to 150° C., and mechanically stirred for 2 h. Upon cooling, the treated hydrous oxide was filtered and washed with DI water until the exiting filtrate reached a neutral pH ~7. The hydrous oxide was then dried at 90° C. for 16 h, ground to a powder, and further dried at 120° C. for 2 h. Upon drying, the hydrous oxide was calcined in air at 500° C. to remove hydroxyls and convert the hydrous oxide to the solid oxide.

Pre-catalyst 4: 100 g hydrous oxide (dry basis) was dispersed in 900 g DI water to form a slurry. A solution of ammonium hydroxide was added to the slurry to adjust the pH to ~10 to 11. The mixture was then sealed in a Hastelloy autoclave, heated to 150° C., and mechanically stirred for 2 h. Upon cooling, the treated hydrous oxide was filtered and washed with DI water until the exiting filtrate reached a neutral pH ~7.

Reference 4 and Pre-catalyst 4 were then analysed for hydroxyl content via thermogravimetric analysis (TGA). The powders were heated from room temperature to 120° C. under flowing nitrogen. The powders were then held isothermally at 120° C. for 2 hours to desorb any weakly adsorbed water. Samples were then heated from 120° C. to 500° C. under flowing nitrogen and the weight loss of each sample was measured. The weight loss was attributed to the condensation reaction between two pendant hydroxyls contained in the solid oxide and hydrous oxide powders as shown below:

M-OH+M-OH→M-O-M+$H_2O$

Wherein M represents a metal atom within the solid or hydrous oxide. The hydroxyl content was then be calculated from TGA using the equation below:

$$[OH] = \frac{\text{weight lost (g)}}{\text{initial weight (g)}} \times \frac{1000 \text{ mmol}}{18 \text{ g}} \times \frac{2 \text{ mmol OH}}{1 \text{ mmol } H_2O}$$

Where [OH] is the hydroxyl content in mmol OH per gram of powder.

Figure 10:
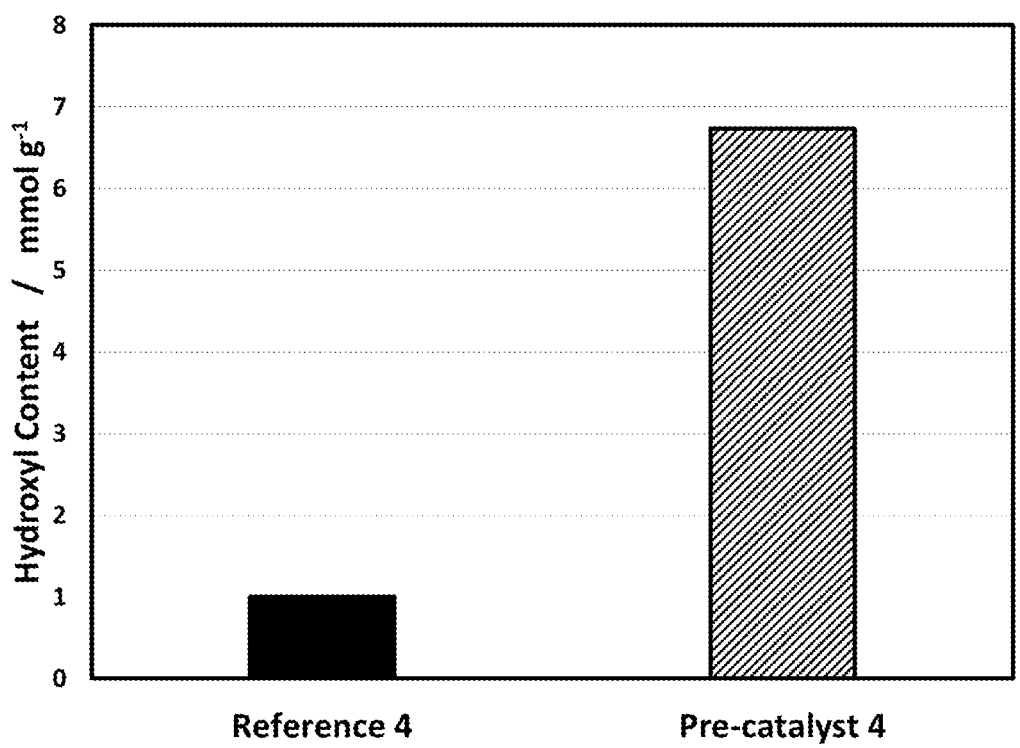
FIG. 10 shows the hydroxyl content for a solid oxide powder and a hydrous oxide powder of equivalent metal compositions (Example 2).

FIG. 10 depicts the hydroxyl content of Reference 4 and Pre-catalyst 4. Pre-catalyst 4 contained approximately 6.7 mmol/g of hydroxyls compared to Reference 4 which only contained approximately 1.0 mmol/g of hydroxyls. These results demonstrate that Pre-catalyst 4 contained a significantly higher quantity of hydroxyls than that of Reference 4.

Reference 4 and Pre-catalyst powder samples were also subject to Rh uptake tests using the following procedure. 10 g (dry basis) solid oxide powder or hydrous oxide powder was dispersed in 90 g DI water at room temperature by mechanical mixing for 2 hours. Rhodium (III) nitrate was added to the solution targeting various Rh loadings on solid oxide (0.6 wt. %, 1.7 wt. %, and 3.1 wt. % respectively) or hydrous oxide support (0.5 wt. %, 1.4 wt. %, and 3.1 wt. % respectively). The solution was then centrifuged and decanted to remove most of the solid material. Finally, the solution was filtered using a 0.1 µm filter syringe. The centrifuged and filtered solution was analysed by ICP-OES to determine the amount of free Rh remaining in solution. The Rh uptake of solid oxide and hydrous oxide were determined using the following formula:

Rh Uptake (%) =

$$\left(1 - \frac{\text{Weight of Rh in solution at the end of the test}}{\text{Weight of Total Intitial Rh added to solution}}\right) \times 100\%$$

Figure 11:
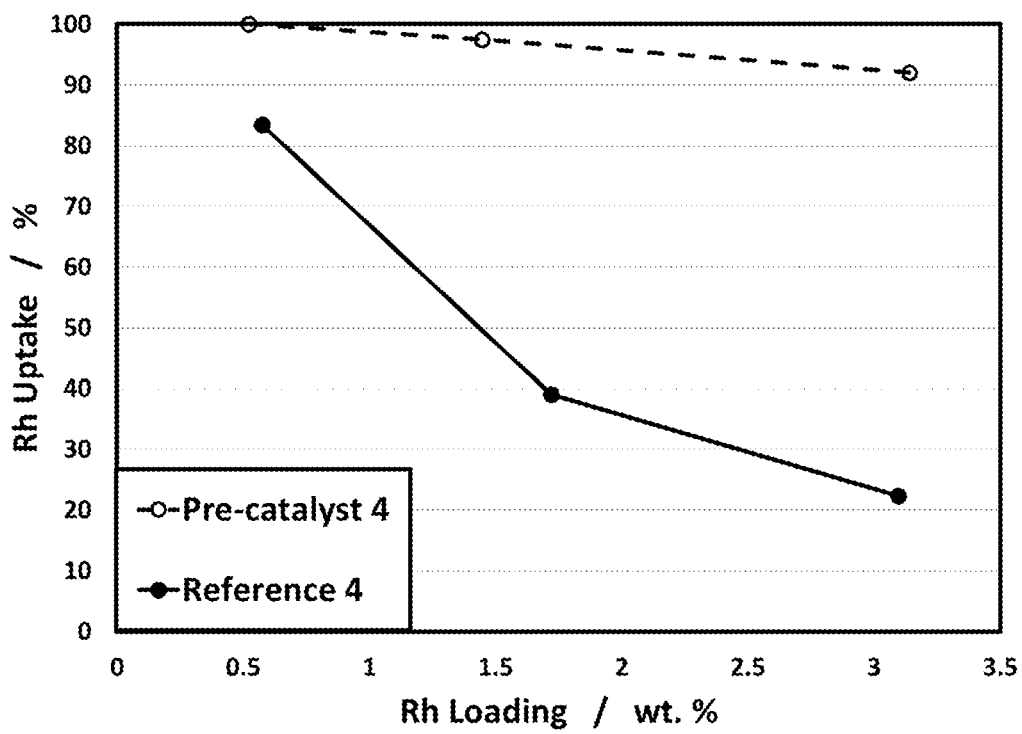
FIG. 11 shows the Rh uptake values at various Rh loadings for a solid oxide powder and a hydrous oxide powder of equivalent metal compositions (Example 2).

The results for the Rh uptake experiment are summarized in FIG. 11. At all Rh loadings, it was observed that Pre-catalyst 4 of the same metal composition as Reference 4 was able to adsorb a far greater Rh amount from simple mixing in solution as evidenced by Rh uptake values. At a target Rh loading of 3 wt. %, the hydrous oxide of Pre-catalyst 4 was able to adsorb >90% of the Rh, while the calcined solid oxide of Reference 4 only adsorbed ~22%. Without wishing to be bound by theory, this higher Rh uptake of the hydrous oxide is tentatively attributed to a favourable electrostatic interaction between Rh ions and the higher hydroxyl content present on the hydrous oxide. The strong driving force for interaction between Rh ions and hydrous oxide allowed for the stabilization of isolated Rh atoms and/or small Rh particles.

Preparation of Catalyst-Coated Substrate Cores

Reference 5: 100 g hydrous oxide (dry basis) was dispersed in 900 g DI water to form a slurry. A solution of ammonium hydroxide was added to the slurry to adjust the pH to ~10 to 11. The mixture was then heated to 75° C., and mechanically stirred for 4 h. Upon cooling, the treated hydrous oxide was filtered and washed with DI water until the exiting filtrate reached a neutral pH ~7. The hydrous oxide was then dried at 90° C. for 16 h, ground to a powder, and further dried at 120° C. for 2 h. Upon drying, the hydrous oxide was calcined in air at 500° C. to remove hydroxyls and convert the hydrous oxide to the solid oxide.

Calcined solid oxide (0.5 g/in$^3$) was dispersed in DI water with mechanical mixing to form a slurry. The slurry was then heated to a temperature of 75° C. while mechanically stirring. Rh (3.5 g/ft$^3$) was added to the slurry in the form of rhodium (III) nitrate solution. A solution of ammonium hydroxide was added to the slurry to re-adjust the pH to ~7 to 8 and the slurry was mixed for 30 minutes. The slurry was then cooled to <40° C. Alumina binder (0.5 g/in$^3$) was added to the slurry. The slurry was then coated onto cylindrical ceramic substrates (400 cells per inch squared, square channels, W/D=4.16", H=3.0") at a washcoat loading of 1.0 g/in$^3$. The coated ceramic substrates were calcined at 500° C. A core measuring 1"×3" was cut from the ceramic substrate to form Reference 5.

Catalyst 5: Hydrous oxide (0.5 g/in$^3$) was dispersed in DI water to form a slurry. The slurry was then heated to a temperature of 75° C. while mechanically stirring. Rh (3.5 g/ft$^3$) was then added to the slurry in the form of rhodium (III) nitrate solution. A solution of ammonium hydroxide was added to the slurry to adjust the pH to ~7-8 and the slurry was mixed for 30 minutes. A solution of ammonium hydroxide was then added to the slurry to re-adjust the pH to ~10 to 11 and the slurry was mixed for 4 hours. The slurry was then cooled to <40° C. Alumina binder (0.5 g/in$^3$) was added to the slurry. The slurry was then coated onto cylindrical ceramic substrates (400 cells per inch squared, square channels, W/D=4.16", H=3.0") at a washcoat loading of 1.0 g/in$^3$. The coated ceramic substrates were calcined at 500° C. A core measuring 1"×3" was cut from the ceramic substrate to form Catalyst 5.

Catalyst 6: Hydrous oxide (0.5 g/in$^3$) was dispersed in DI water to form a slurry. The slurry was then heated to a temperature of 75° C. while mechanically stirring. A solution of ammonium hydroxide was then added to the slurry to adjust the pH to ~10 to 11 and the slurry was mixed for 2 hours. Rh (3.5 g/ft$^3$) was then added to the slurry in the form of rhodium (III) nitrate solution. The slurry was allowed to mix at elevated temperature for an additional 2.5 hours. The slurry was then cooled to <40° C. Alumina binder (0.5 g/in$^3$) was added to the slurry. The slurry was then coated onto cylindrical ceramic substrates (400 cells per inch squared, square channels, W/D=4.16", H=3.0") at a washcoat loading of 1.0 g/in$^3$. The coated ceramic substrates were calcined at 500° C. A core measuring 1"×3" was cut from the ceramic substrate to form Catalyst 6.

Example 3: Accelerated Aging of the Catalyst Cores in a Reactor and Three-Way Catalysis (TWC) Light-Off Test Reference 5, Catalyst 5, and Catalyst 6 were subjected to high temperature aging to simulate long-term operation on a vehicle. The cores were placed in a tube furnace and heated to 1050° C. at a rate of 10° C./minute under a stoichiometric gas mixture composed of: 1.2% CO, 0.4% $H_2$, 0.8% $O_2$, 10% $H_2O$, 10% $CO_2$, balance $N_2$ flowing at 5 L/minute. The temperature was then held at 1050° C. for 40 hours while the flowing gas mixture was altered every 5 minutes in the order listed below:
1. Stoichiometric: 1.2% CO, 0.4% $H_2$, 0.8% $O_2$, 10% $H_2O$, 10% $CO_2$, balance $N_2$
2. Lean: 1.2% CO, 0.4% $H_2$, 1.6% $O_2$, 10% $H_2O$, 10% $CO_2$, balance $N_2$
3. Stoichiometric: 1.2% CO, 0.4% $H_2$, 0.8% $O_2$, 10% $H_2O$, 10% $CO_2$, balance $N_2$
4. Rich: 2.4% CO, 0.8% $H_2$, 0.8% $O_2$, 10% $H_2O$, 10% $CO_2$, balance $N_2$ After 40 h, the coated cores were cooled from 1050° C. to 400° C. under the rich gas mixture and then from 400° C. to room temperature under $N_2$ only.

Figure 12:
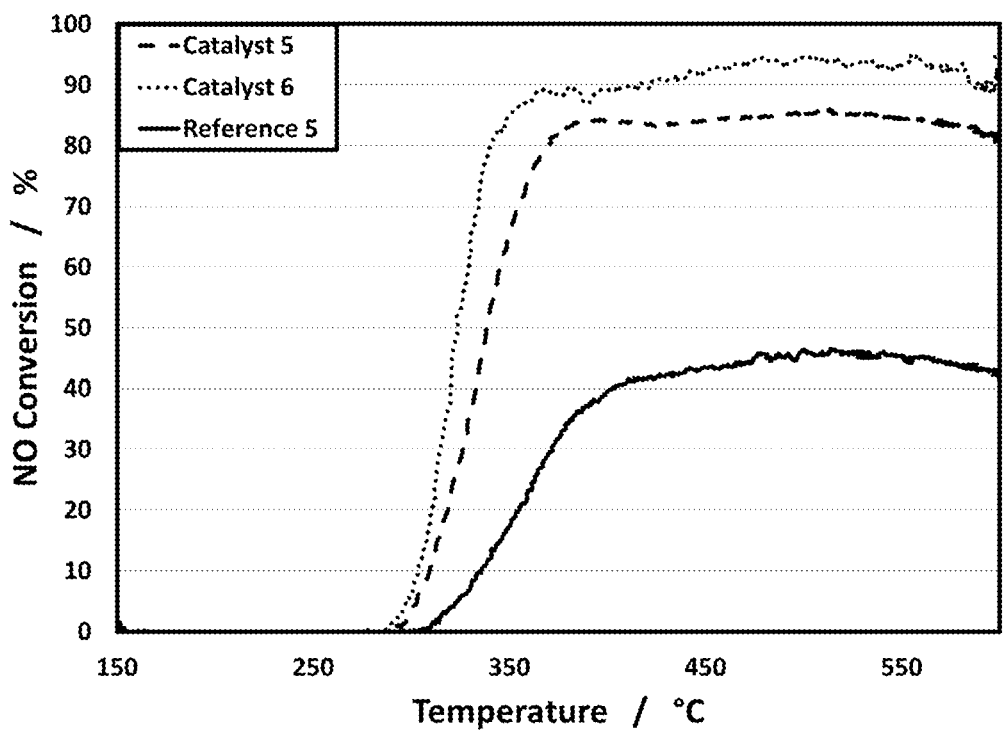
FIG. 12 shows the NO conversion for Reference 5, Catalyst 5, and Catalyst 6 during the catalyst core TWC Light-Off test.
Figure 13:
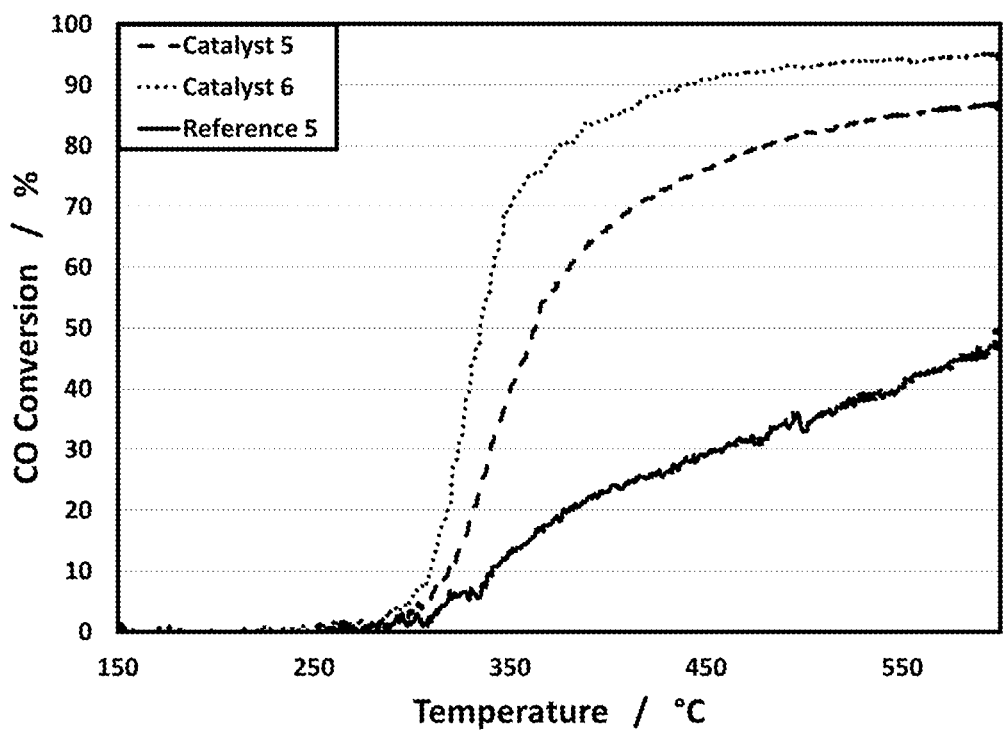
FIG. 13 shows the CO conversion for Reference 5, Catalyst 5, and Catalyst 6 during the catalyst core TWC Light-Off test.
Figure 14:
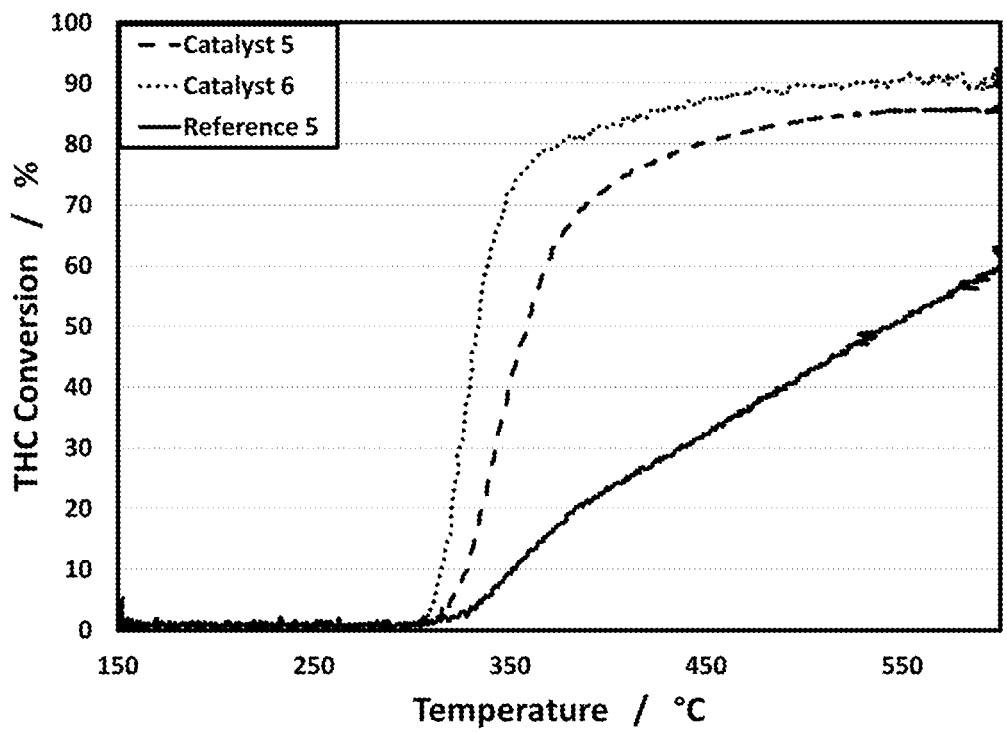
FIG. 14 shows the THC conversion for Reference 5, Catalyst 5, and Catalyst 6 during the catalyst core TWC Light-Off test.

After being subject to aging conditions described above, 1"×3" cores of the catalyst articles of Reference 5, Catalyst 5, and Catalyst 6 were subject to a typical TWC light-off test under simulated gasoline exhaust conditions. In this test, temperature was ramped from 150° C. to 600° C. at a rate of 50° C./min under a flowing gas mixture designed to simulate exhaust of a gasoline vehicle at a GHSV=200,000 hr$^{-1}$. The gas composition was perturbed at a frequency of 1 Hz between the following compositions: 1) 1080 ppm propene, 120 ppm isopentane, 2.28% CO, 0.17% $H_2$, 500 ppm NO, 0.49% $O_2$, 14% $CO_2$, 10% $H_2O$ and 2) 1080 ppm propene, 120 ppm isopentane, 0.5% CO, 0.17% $H_2$, 500 ppm NO, 1.28% $O_2$, 14% $CO_2$, 10% $H_2O$. The light-off test results are shown in FIGS. 12-14 for NO, CO, and total hydrocarbons (THC, comprised of propene and isopentane) conversions, respectively.

A useful metric for quantifying performance of a catalyst is the $T_{20}$ value which is herein defined as the minimum temperature at which 20% conversion is achieved. Lower $T_{20}$ temperatures mark catalysts that demonstrate enhanced catalytic activity. In each case, the catalytic activity was greater for Catalyst 5 and Catalyst 6 than for Reference 5 as evinced by the $T_{20}$ values achieved by each catalyst. As shown in FIGS. 12-14, Catalyst 5 achieved $T_{20}$ values for NO, CO, and THC conversions that were 37° C., 50° C., and 46° C. lower, respectively, than those of Reference 5. Catalyst 6 achieved $T_{20}$ values for NO, CO, and THC conversions that were 45° C., 60° C., and 61° C. lower, respectively, than those of Reference 5.

Another useful metric for quantifying catalytic performance is the final conversion value each catalyst can achieve at maximum temperature (600° C. in this test). As shown in FIGS. 12-14, at maximum temperature, Catalyst 5 achieved NO, CO, and THC conversions that were 38%, 40%, and 25% higher, respectively, than the conversions achieved by Reference 5. At maximum temperature, Catalyst 6 achieved NO, CO, and THC conversions that were 48%, 47%, and 31% higher, respectively, than the conversions achieved by Reference 5. Thus, metrics determined from a typical TWC light-off test demonstrate that the catalysts prepared in Catalyst 5 and Catalyst 6 exhibit superior performance as gasoline vehicle emissions catalysts relative to Reference 5.

Example 4: Catalyst Core Lambda Sweep Test

During gasoline vehicle operation, the air/fuel ratio is constantly in flux due to the variability in user input during real driving conditions. The optimum air/fuel ratio for converting hazardous emissions (NO, CO, THC) is known as the stoichiometric point. The variability in the air/fuel ratio from the ideal stoichiometric point is often calculated using a coefficient known as lambda ($\lambda$). Thus, it is useful and meaningful to measure the performance of catalysts under a wide range of fluctuating $\lambda$ values to understand their behaviour in real-world conditions on a vehicle.

The coefficient $\lambda$ is herein defined as the ratio of the actual air/fuel ratio to the stoichiometric air/fuel ratio and is described by the following equation:

$$\lambda = \frac{[CO_2] + \left[\frac{CO}{2}\right] + [O_2] + \left[\frac{NO}{2}\right] + \left[\frac{H_2O}{2}\right]}{[CO_2] + [CO] + \sum_{i=0}^{n}\left((C_{factor,i} \times [HC_i]) \times \left(\frac{4 + H_{CV,i} - 2 \times O_{CV,i}}{4}\right)\right) + \left[\frac{H_2}{2}\right] + \left[\frac{H_2O}{2}\right]}$$

Where:
[X]=gas concentration in percent volume
$H_{CV,i}$=Atomic ratio of hydrogen to carbon in hydrocarbon molecule i
$O_{CV,i}$=Atomic ratio of oxygen to carbon in hydrocarbon molecule i
$C_{factor,i}$=Number of carbon atoms in hydrocarbon molecule i After being subject to aging conditions described in Example 3, 1"×3" cores of the catalyst articles of Reference 5, Catalyst 5, and Catalyst 6 were subject to a lambda sweep test under simulated gasoline exhaust conditions. In this test, temperature was held isothermally at 500° C. under a flowing gas mixture designed to simulate exhaust of a gasoline vehicle at a GHSV=100,000 hr$^{-1}$. Over the course of 45 minutes, $\lambda$ was stepped down at regular intervals (every 1 second) from an average value of 1.04 to an average value of 0.98 by altering the O2 concentration while oscillating at a frequency of 1 Hz and an amplitude of 0.05. The mean gas composition at the start of the test ($\lambda$=1.04) was 600 ppm propene, 600 ppm propane, 1.0% CO, 0.33% H$_2$, 2000 ppm NO, 1.5% O$_2$, 14% CO$_2$, 10% H$_2$O. The mean gas composition at the end of the test ($\lambda$=0.98) was 600 ppm propene, 600 ppm propane, 1.0% CO, 0.33% H$_2$, 2000 ppm NO, 0.375% O$_2$, 14% CO$_2$, 10% H$_2$O.

Figure 15:
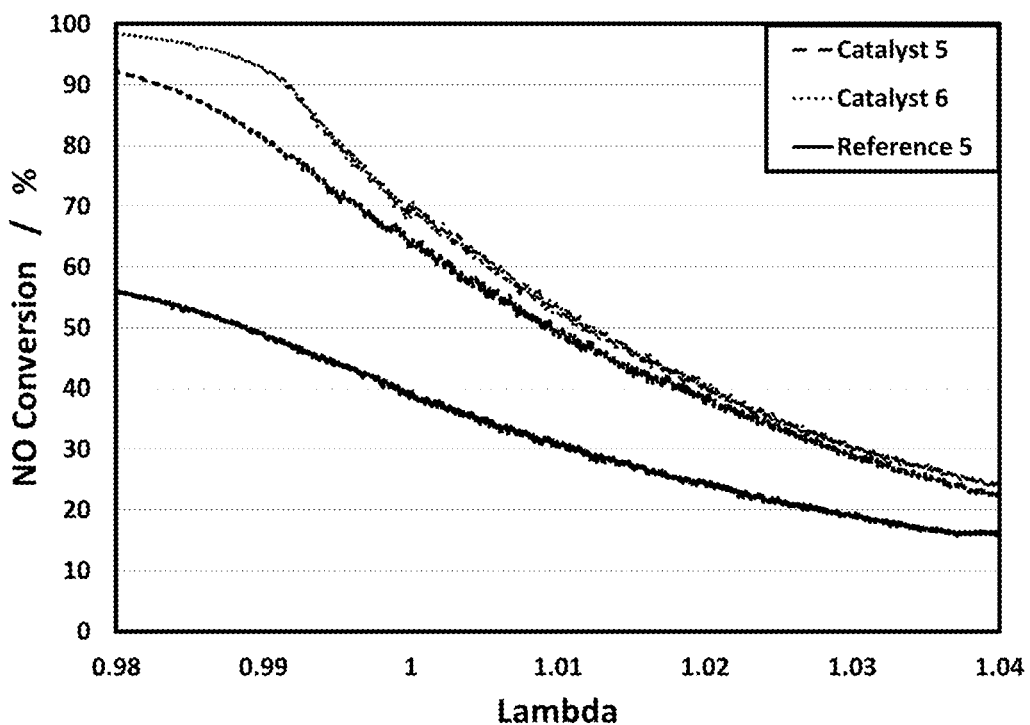
FIG. 15 shows the NO conversion for Reference 5, Catalyst 5, and Catalyst 6 during the catalyst core Lambda Sweep test.
Figure 16:
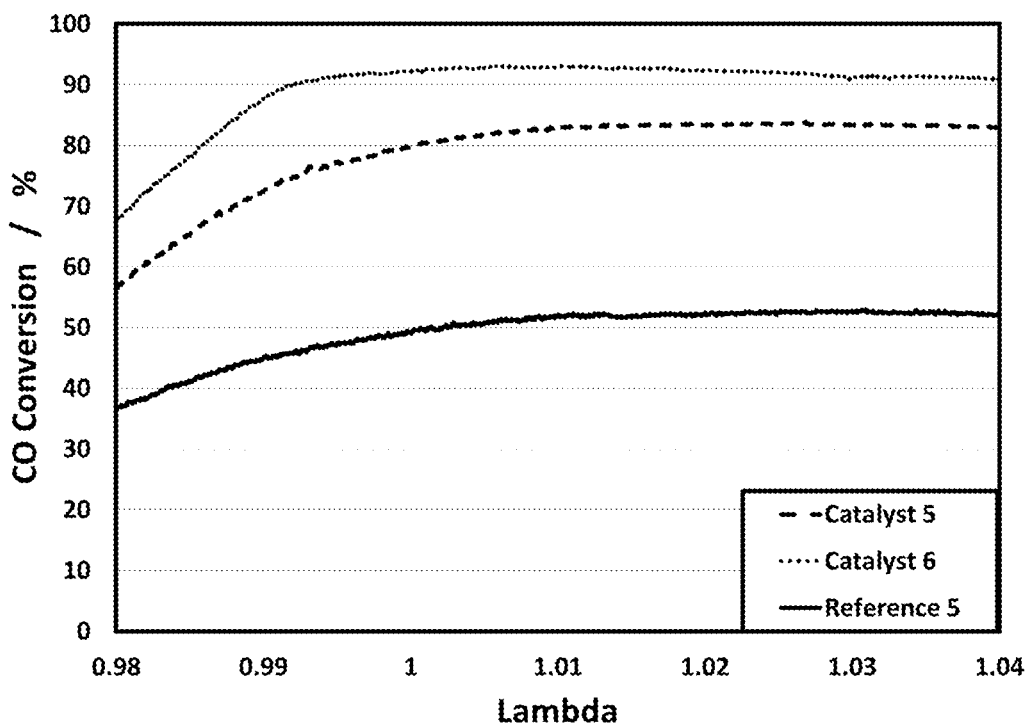
FIG. 16 shows the CO conversion for Reference 5, Catalyst 5, and Catalyst 6 during the catalyst core Lambda Sweep test.
Figure 17:
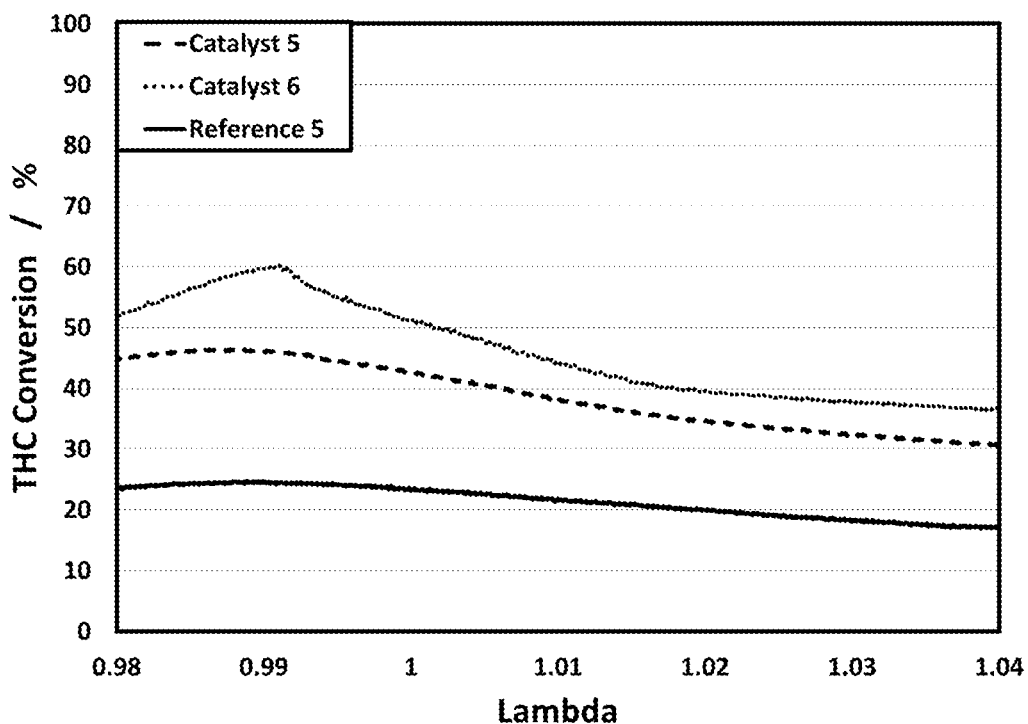
FIG. 17 shows the THC conversion for Reference 5, Catalyst 5, and Catalyst 6 during the catalyst core Lambda Sweep test.

The lambda sweep test results are shown in FIGS. 15-17 for NO, CO, and THC (comprised of propene and isopentane) conversions, respectively. Catalyst 5 and Catalyst 6 were both able to achieve higher conversions for all three emissions (NO, CO, and THC) than Reference 5 across the entire lambda operating window (1.04<<0.98). Under so-called "lean" conditions ($\lambda$>1), Catalyst 5 was able to achieve NO, CO, and THC conversions that were 6%, 31%, and 14% higher than that achievable by Reference 5. Under so-called "rich" conditions ($\lambda$<1), Catalyst 5 was able to achieve NO, CO, and THC conversions that were 36%, 20%, and 22% higher than that achievable by Reference 5. Under so-called "lean" conditions ($\lambda$>1), Catalyst 6 was able to achieve NO, CO, and THC conversions that were 9%, 39%, and 20% higher than that achievable by Reference 5. Under so-called "rich" conditions ($\lambda$<1), Catalyst 6 was able to achieve NO, CO, and THC conversions that were 42%, 30%, and 29% higher than that achievable by Reference 5. Thus, Catalyst 5 and Catalyst 6 both exhibited superior performance under real-world fluctuating exhaust gas conditions relative to Reference 5.

Preparation of Full Formulation Catalyst Coated Substrates

Reference 6 (ceramic substrate containing bottom layer catalyst washcoat): A reference bottom layer of washcoat was prepared by forming a slurry of Pd in the form of Pd (II) nitrate, a rare earth-doped ceria-zirconia mixed oxide, Ba in the form of Ba (II) hydroxide, and a gamma alumina. This washcoat was coated onto cylindrical ceramic substrates (750 cells per inch squared, hexagonal channels, W/D=4.66", H=2.93") at a washcoat loading of 2.1 g/in$^3$. The coated ceramic substrates were calcined at 500° C. This pre-coated ceramic substrate was then used in the preparation of Reference 7 and Catalyst 7.

Pre-catalyst 7: 100 g hydrous oxide (dry basis) was dispersed in 900 g DI water to form a slurry. A solution of ammonium hydroxide was added to the slurry to adjust the pH to ~10 toll. The mixture was then sealed in a Hastelloy autoclave, heated to 150° C., and mechanically stirred for 2 h. Upon cooling, the treated hydrous oxide was filtered and washed with DI water until the exiting filtrate reached a neutral pH ~7. This material will hereafter be referred to as Pre-catalyst 7.

Reference 7: Pre-catalyst 7 was dried at 90° C. for 16 h, ground to a powder, and further dried at 120° C. for 2 h. Upon drying, the hydrous oxide was calcined in air at 500° C. to remove hydroxyls and convert the hydrous oxide to the solid oxide.

The calcined solid oxide (1.0 g/in$^3$) was dispersed in DI water with mechanical stirring to form a slurry. The pH of the slurry was raised to ~10 to 11 using aqueous ammonium nitrate. Rh (4 g/ft$^3$) was added to the slurry in the form of Rh (III) nitrate solution and the solution was allowed to mix for 30 minutes. Gamma alumina (0.3 g/in$^3$) was then added to the slurry. This washcoat was coated onto Reference 6 at a washcoat loading of 1.3 g/in$^3$. The coated ceramic substrates were calcined at 500° C. to form Reference 7.

Catalyst 7: Pre-catalyst 7 (1.0 g/in$^3$) was dispersed in DI water with mechanical stirring to form a slurry. The pH of the slurry was raised to ~10 to 11 using aqueous ammonium nitrate. Rh (4 g/ft$^3$) was added to the slurry in the form of Rh (III) nitrate solution and the solution was allowed to mix for 30 minutes. Gamma alumina (0.3 g/in$^3$) was then added to the slurry. This washcoat was coated onto Reference 6 at a washcoat loading of 1.3 g/in$^3$. The coated ceramic substrates were calcined at 500° C. to form Catalyst 7.

Example 5: Real-World Driving Emissions (RDE) Test on Catalyst Coated Substrates on an Engine Reference 7 and Catalyst 7 were subjected to high temperature aging on an engine bench to simulate long-term operation on a vehicle. All catalysts were engine bench aged for 150 hours while subject to a cycle of 40 seconds stoichiometric/6 seconds rich/14 seconds lean exhaust gas conditions targeting an inlet catalyst temperature of 875° C.

After engine aging, Reference 7 and Catalyst 7 were tested using a 2.0 L engine bench dynamometer performing a bespoke original equipment manufacturer designed real-world driving emissions (RDE) cycle comprising acceleration and fuel shut-off conditions representing a cold urban, motorway, and hot urban speed phases. The cycle length was 2700 seconds from ambient-soaked conditions, reaching an approximate peak catalyst bed temperature of 700° C. and 250 kg/h mass air flow rate. $NO_x$, CO and THC emissions at post catalyst position were measured and accumulated mass of each species was calculated across the cycle.

Figure 18:
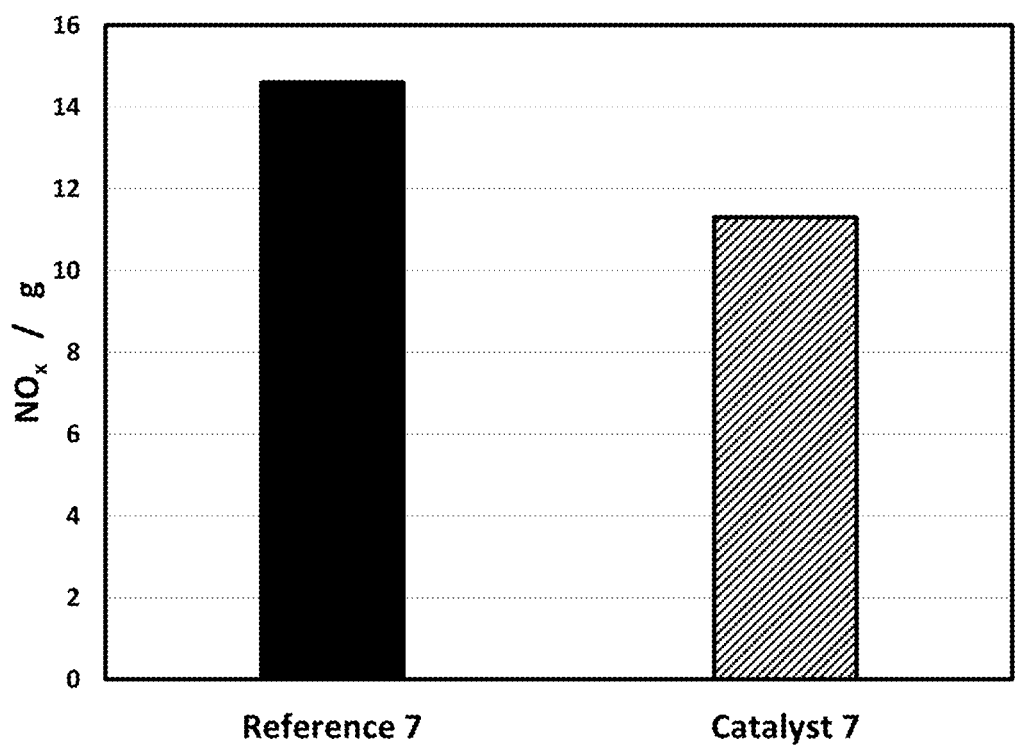
FIG. 18 shows the cumulative $NO_x$ emissions for Reference 7 and Catalyst 7 during the RDE test on an engine bench dynamometer.
Figure 19:
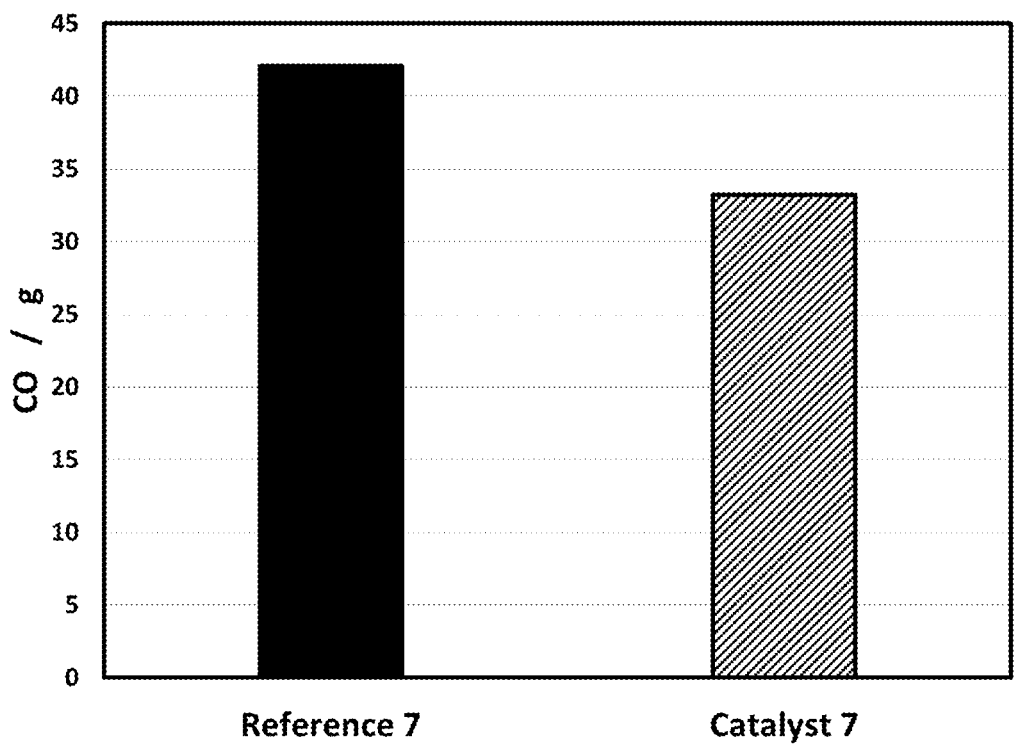
FIG. 19 shows the cumulative CO emissions for Reference 7 and Catalyst 7 during the RDE test on an engine bench dynamometer.
Figure 20:
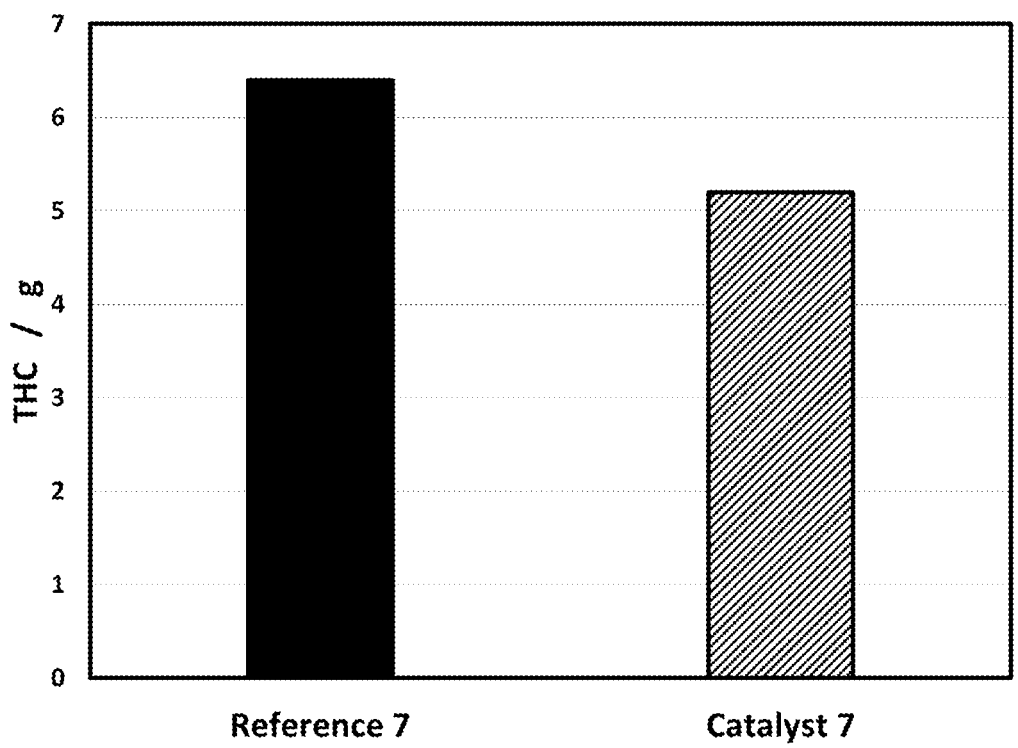
FIG. 20 shows the cumulative THC emissions for Reference 7 and Catalyst 7 during the RDE test on an engine bench dynamometer.

The cumulative emissions of $NO_x$, CO, and THC for Reference 7 and Catalyst 7 are displayed in FIGS. 18-20, respectively. Catalysts that can more effectively convert engine exhaust emissions into less harmful products will emit fewer total emissions. As shown in FIGS. 18-20, Catalyst 7 emitted 22% lower $NO_x$, 26% lower CO, and 16% lower THC emissions than Reference 7. These results demonstrate that Catalyst 7 of the present invention exhibits enhanced catalytic activity relative to Reference 7 and is suitable as a catalyst in a gasoline vehicle emissions system.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of manufacturing a catalyst intermediate, the method comprising:
   providing a slurry comprising a hydrous oxide of one or more of aluminium, cerium and zirconium; and
   contacting the slurry comprising a hydrous oxide with platinum group metal (PGM) ions to provide a PGM-containing slurry; and
   wherein the hydrous oxide has a hydroxyl content of 2-20 mmol/g.

2. The method of claim 1 further comprising heating the PGM-containing slurry.

3. The method of claim 1 further comprising a step of heating the slurry comprising a hydrous oxide prior to contacting the slurry comprising a hydrous oxide with PGM ions.

4. The method of claim 1 further comprising adjusting the pH of the slurry comprising a hydrous oxide and/or the PGM-containing slurry to from 7 to 14.

5. The method of claim 1, wherein the hydrous oxide has not been calcined.

6. The method of claim 1, wherein providing a slurry comprising a hydrous oxide comprises contacting an aqueous solution comprising one or more of aluminium ions, cerium ions and zirconium ions with a basic aqueous solution.

7. A catalyst intermediate comprising:
   a hydrous oxide network comprising a hydrous oxide of one or more of aluminium, cerium and zirconium, the hydrous oxide network comprising PGM ions encapsulated therein; and wherein the hydrous oxide has a hydroxyl content of 2-20 mmol/g.

8. The catalyst intermediate of claim 7, wherein the hydrous oxide network has not been calcined.

9. A method of manufacturing a catalyst article, the method comprising:
   manufacturing the catalyst intermediate according to claim 1;
   providing a slurry comprising the catalyst intermediate;
   applying the slurry comprising the catalyst intermediate to a substrate; and
   heating the slurry.

10. A method of manufacturing a catalyst article, the method comprising:
    manufacturing the catalyst intermediate according to claim 1;
    calcining the catalyst intermediate to form a catalyst composition;
    providing a slurry comprising the catalyst composition;
    applying the slurry comprising the catalyst composition to a substrate; and
    heating the slurry.

11. The method of claim 9, wherein the catalyst article is for three-way catalysis.

12. An intermediate comprising:
    a hydrous oxide of one or more of aluminium, cerium and zirconium, wherein the hydrous oxide has a hydroxyl content of 2-20 mmol/g.

13. The intermediate of claim 12, wherein the hydrous oxide comprises a mixed hydrous oxide of cerium and zirconium.

14. The intermediate of claim 12, wherein the hydrous oxide has a hydroxyl content of 3-18 mmol/g.

15. The intermediate of claim 12, wherein the hydrous oxide further comprises a dopant selected from the group consisting of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium.

16. The intermediate of claim 15, wherein the dopant is one or more of lanthanum, neodymium, praseodymium and yttrium.

17. The intermediate of claim 15, wherein the dopant is present in the hydrous oxide in an amount of from 0.001 wt. % to 20 wt.

18. A method of manufacturing an intermediate, the method comprising:
    (1) providing a slurry comprising a hydrous oxide of one or more of aluminium, cerium and zirconium; and
    (2a) heating the slurry in (1) at a temperature of from 100 to 175° C.; and/or
    (2b) adjusting the pH of the slurry in (1) to from 7 to 14;
    wherein the intermediate has a hydroxyl content of 2-20 mmol/g.

19. The method of claim 18, wherein the intermediate has a hydroxyl content of 3-18 mmol/g.

20. The method of claim 18, wherein the hydrous oxide comprises a mixed hydrous oxide of cerium and zirconium.

21. The method of claim 18, wherein the hydrous oxide further comprises a dopant selected from the group consisting of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium.

22. The method of claim 18, wherein providing a slurry comprising a hydrous oxide comprises contacting an aqueous solution comprising one or more of aluminium ions, cerium ions and zirconium ions with a basic aqueous solution.

* * * * *